United States Patent
Yamaashi et al.

(10) Patent No.: US 6,337,709 B1
(45) Date of Patent: Jan. 8, 2002

(54) IMAGE DISPLAY DEVICE

(75) Inventors: Kimiya Yamaashi, Hitachi; Masayuki Tani; Harumi Uchigasaki, both of Hitachinaka; Masayasu Futakawa; Yukihiro Kawamata, both of Hitachi; Atsuhiko Nishikawa, Mito, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/598,699

(22) Filed: Feb. 8, 1996

(30) Foreign Application Priority Data

Feb. 13, 1995 (JP) ............................................. 7-023675

(51) Int. Cl.[7] .............................................. H04N 7/18
(52) U.S. Cl. ........................................ 348/143; 348/159
(58) Field of Search ................................. 348/211, 213, 348/143, 141, 140, 136, 137, 20, 13, 15, 169, 170, 159, 587, 586

(56) References Cited

U.S. PATENT DOCUMENTS

| | | | |
|---|---|---|---|
| 4,790,028 A | 12/1988 | Ramage | 382/47 |
| 4,961,211 A * | 10/1990 | Tsugane et al. | 348/143 |
| 5,164,827 A * | 11/1992 | Paff | 358/108 |
| 5,200,818 A * | 4/1993 | Neta et al. | 348/143 |
| 5,258,837 A | 11/1993 | Gormley | 348/143 |
| 5,371,536 A * | 12/1994 | Yamaguchi | 348/169 |
| 5,384,588 A * | 1/1995 | Martin et al. | 348/15 |
| 5,396,287 A * | 3/1995 | Cho | 348/211 |
| 5,598,209 A * | 1/1997 | Cortjens et al. | 348/211 |
| 5,644,386 A | 7/1997 | Jenkins et al. | 348/418 |
| 5,671,012 A | 9/1997 | Oyashiki et al. | 348/132 |
| 5,808,670 A | 9/1998 | Oyashiki et al. | 348/143 |

OTHER PUBLICATIONS

GestureCam: A Video Communication System for Sympathetic Remote Callaboration Hideaki Kuzuoka, et al (1994) pp. 35–43.

* cited by examiner

*Primary Examiner*—Andy Rao
(74) *Attorney, Agent, or Firm*—Antonelli, Terry, Stout & Kraus, LLP

(57) ABSTRACT

An image display includes whole image display for displaying an area viewed by a certain camera, a camera position detecting using for detecting a place which the camera is viewing and camera position display unit for specifying the area that the camera displays on the whole image on the basis of the camera position acquired by the above camera position detecting unit. A user recognizes the place in the whole image that he is watching and does not lose his location when he pans or zooms the camera.

16 Claims, 18 Drawing Sheets

IMAGE DISPLAY DEVICE

BACKGROUND OF THE INVENTION

The present invention relates to an image display device for use in a system for displaying camera images in plant control systems, remote conference systems, etc. and a system for using the image display device.

In plant systems and remote conference systems, the states and conditions of remote sites and conference halls are observed by displaying the remote sites and the conference rooms using images taken by a camera. In these systems, the cameras are not always fixed cameras. For example, in the case of plant monitoring systems, there are disposed cameras which are capable of panning and zooming, and an operator sometimes pans the cameras and monitors areas which are not normally in one scene or zooms the cameras to expand the view so as to observe selected areas in detail.

In systems utilizing cameras that are movable for panning or zooming, as mentioned above, images taken in by cameras are displayed on the screens of remote TV's or computers. Therefore, when cameras pan or zoom, the operators are often not able to judge which sites they are observing. When a camera can pan or zoom, there is a problem that an operator may not know which part of an monitored object he is observing with the camera.

There also another problem in that it is difficult to control a camera to take the image of a specific part, when the specific part of the whole object or scene is to be examined with the specified camera.

SUMMARY OF THE INVENTION

An object of the present invention is to solve the above mentioned problems, and to provide an image display device that can display camera images with good usability.

In order to achieve the above mentioned objects, the image display device of the present invention is featured by means for displaying on a screen an image of the whole area that can be taken in by a camera; means for detecting a position of the camera on the screen by detecting the state of the camera, such as the pointing direction of the camera, the zooming ratio, etc.; means for marking the present area on the screen taken in by the camera position detecting means; and means for renewing the whole image on the screen at a predetermined timing.

Another feature of the present invention resides in an image display device having whole image displaying means for displaying an area which is larger than the whole area being viewed by a camera; area specifying means for specifying an area in the whole image; and control means for controlling the camera in such a way as to take images of the area specified by the area specifying means. A whole image taking in means takes images of the whole area viewed by the camera and displays the whole image on the display screen. The camera position detecting means detects the state of the camera panning and zooming so as to predict when the present image being taken by the camera corresponds to a specified part of the whole image in accordance with information concerning the state of the camera. The camera area display means puts marks on the positions at whole image detected by the above camera position detecting means.

A whole image renewal means renews the whole image, in view of the possibility of the image being changed in the future, in accordance with a predetermined timing. Since it is possible to clearly indicate what part or position on the whole image is being viewed, operators need not worry about trying to identify what places they are observing. The area specifying means specifies the area to be viewed by the camera on the whole image displayed by the display means. The camera control means controls the state of panning or zooming of the camera to take in images of an area specified by the area specifying means. Operators are able to correctly and quickly control the camera while easily identifying the specified part being viewed, even when they want to take in images of specified parts of an image.

DETAILED DESCRIPTION OF THE PREFERRED EMBODIMENTS

The present invention is concerned with a system for indicating what part or area a camera is viewing, by displaying the present area which is being viewed by the camera as a whole image, the whole image that the camera can view being memorized in advance, when controlling a camera which can pan and zoom. By using this system, a user can immediately know the area of the camera image that is being viewed and can easily control the camera.

Figure 1:
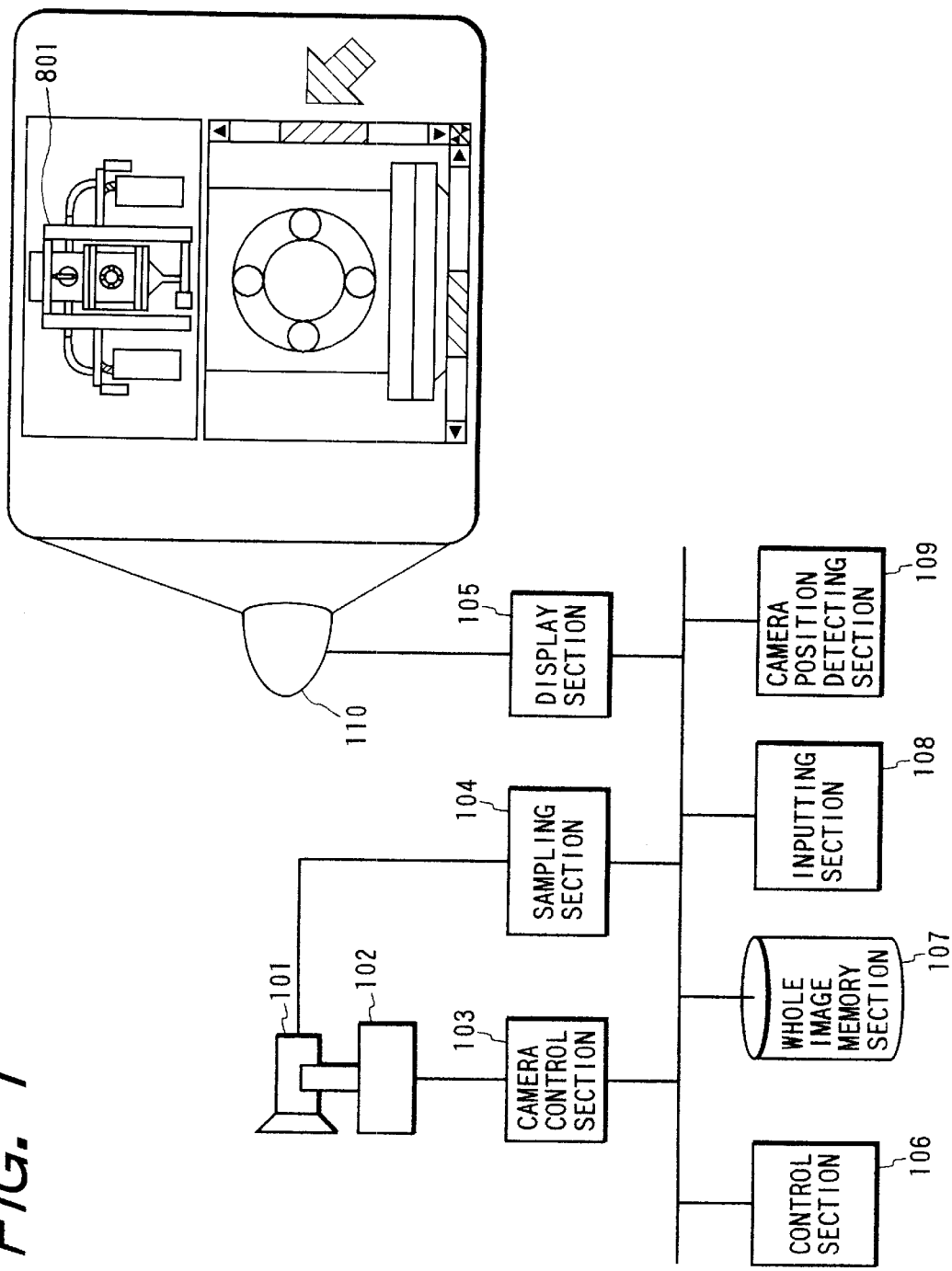
FIG. 1 is a system diagram of an example of the present invention.

The system diagram of a first example will be explained by reference to FIG. 1. The example is related to a monitoring system for use in a thermal power plant. Camera 101 and universal head 102 of a motorized camera are disposed at a place which is remote from the control room where operators work. Universal head 102 controls the viewing directions and the viewing angles of the camera 101 and performs panning and zooming. A control line of the universal head 102 and an image line from camera 101 are installed from camera 101 on site to the control room where there are the operators, i.e. the users, are located.

There is a console for the operator in the control room, and the control line and the image line are connected to the console. The console is composed of a plurality of parts. Control section 106 controls all jobs of the console. Input section 108 conveys the commands of the operator to the console. Sampling part 104 takes in the image from camera 101 at the console through the image line connected to the camera 101. Whole image memory section 107 memorizes the image of all areas that can be viewed by camera 101 in advance.

Camera control section 103, operating through the control line extending from motorized universal head 102, detects the state of the panning or zooming by the universal head 102, outputs commands for panning or zooming to universal head 102 and controls the universal head 102. Camera position detecting section 109 presumes a portion of the whole area that camera 101 is viewing in accordance with information concerning panning and zooming received from universal head 102 as detected by the camera control section 103. Camera position detecting section 109 also calculates the quantity of panning and zooming of the camera 101 based on the area of the whole image. Display part 105 displays the whole image, from data received from the whole image memory section 107 and the camera image taken in by sampling section 104, on display screen 110, and display area 801 that represents the viewing area of camera 101 that was calculated in the camera position detecting element 109 is shown on the display screen. The outline flow chart that specifies display area 801 of the camera image on the display screen by the above system will be explained by reference to FIG. 2.

Control section 106 takes in the whole image at (step 1) 201. Before displaying the whole image, control section 106 receives the whole image and memorizes it in whole image memory section 107. Control section 106 carries out repeatedly the processing from (step 2) 202 to (step 6) 206, until a notification indicating the end of display is input by input section 108. Control section 106 samples camera images at (step 2) 202. In this example, the input of camera 101 is supplied to sampling section 104 through the image line as az signal in the NTSC system that represents an ordinary camera signal from camera 101. Sampling section 104 samples the camera images as a signal of 8 bits consisting of the side view and vertical view of 640×480 dots and 1 dot RGB. Of course, the number of pixels at the time of sampling and the number of bits of each pixel may consist of other values.

Control section 106 receives information indicating a pickup direction and a viewing angle of camera 101 from camera control section 103 at (step 3) 203. In case where there is a requirement for acquiring information concerning camera 101 from control section 106, camera control section 103 confirms the present state to motorized universal head 102 and returns data to control section 106. The information which is returned is the current pickup direction and viewing angle of camera 101. Such details will be described later. In this system, universal head 102 always stores information indicating the pickup direction of camera 101 and the viewing angle and returns this information to camera control section 103 through the control line in response to inquiries from the camera control section 103.

At (step 4) 204, control section 106 recognizes which parts of the whole image are being displayed based on the camera information obtained in the previous step, and operates to adjust the calculation of the camera displaying position and supply this information to camera position detecting section 109.

In (step 5) 205, control section 106 displays the image sampled in (step 2) 202 for the predetermined position on display screen 110 by using display section 105. At this time, the images are displayed as contracted images or enlarged images by adjusting the displayed data to the size of display area 801.

In (step 6) 206, control section 106 displays the whole image as memorized in (step 1) 201 at the predetermined position on display screen 110 by using display section 105. At this time, by adjusting the data to the size of the whole image display area, the whole image is displayed as contracted images or enlarged images.

In (step 7) 207, control section 106 displays a certain area calculated in the (step 4) 204 with respect to the whole area of the camera image on display screen 110 by using display section 105.

Individual steps of the outline flow chart will be explained in the following. Taking in the whole image is performed as follows. In order to determine the size of the whole image, the specifications of universal head 102 of this system will be explained with reference to FIG. 3. Universal head 102 of this system can change the zooming ratio in accordance with the value of the viewing angle. In this system, the maximum viewing angles in the horizontal and vertical directions when the zooming ratio of camera 101 is set to a minimum are 30 degrees in each direction. The minimum viewing angles in the horizontal and vertical directions when the zooming ratio is set to a maximum are 5 degrees in each direction. In general, since the vertical and horizontal viewing angles are determined by the lens length in the camera system, the relation between the vertical viewing angle and the horizontal viewing angle is constant. In this system, the relation is supposed to be always the same value. However, in this description, the vertical and horizontal viewing angles are described as independent parameters for the purpose of generalization.

Figure 3:
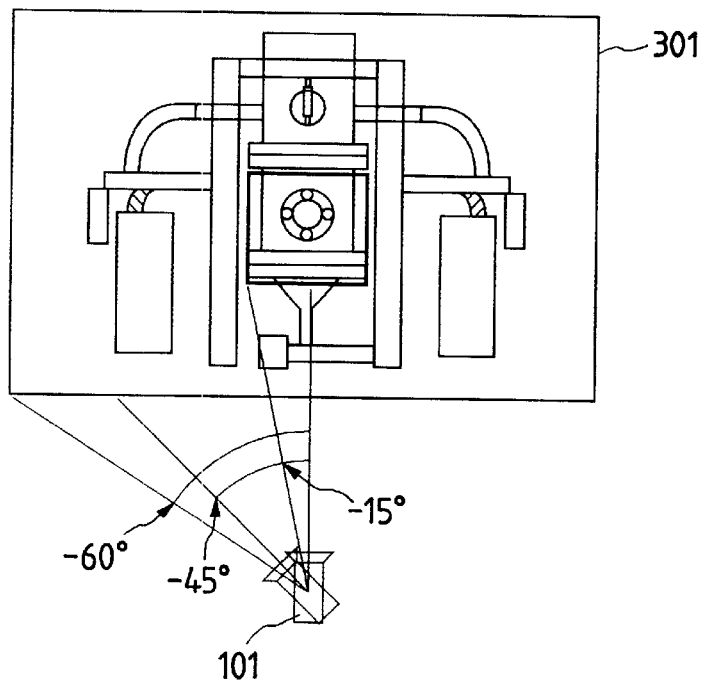
FIG. 3 is a diagram which shows the relationship between camera parameters and the camera images in accordance with the present invention.

The panning direction is zero degree in the frontal view and 45 degrees in left and right directions, as shown in FIG. 3. The left direction is indicated by a minus mark. The vertical direction is scanned upward and downward within 45 degrees in the same manner as in the horizontal direction. The upward direction is plus and the downward direction is minus.

When the maximum scanning values of camera 101 and universal head 102 in the system are determined, the area (whole area) that can be viewed by camera 101 is determined where camera 101 and universal head 102 are used. For example, taking in images or a pickup of images is performed within ±60 degrees in the horizontal direction. When camera 101 is directed to −45 degrees in a maximum left direction of 30 degrees of the maximum viewing angle, camera 101 can view an area beyond the viewing angle by 15 degrees, as shown in FIG. 3. Accordingly, the area 301 can be viewed in the horizontal and vertical directions of ±60 degrees.

Figure 4:
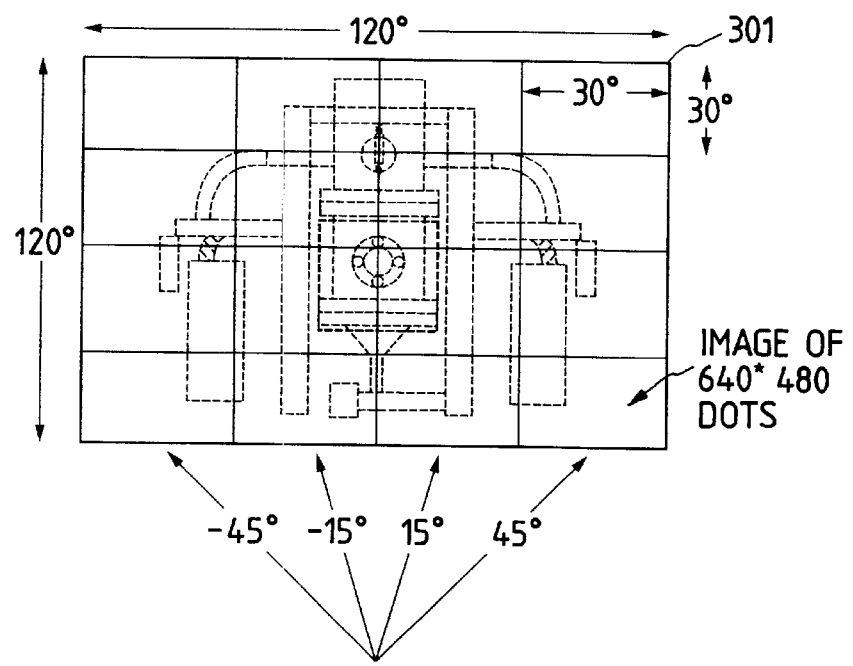
FIG. 4 is a diagram which shows the relationship between the camera parameters and the whole image in accordance with the present invention.

The whole image is taken in by an image pickup repeated several times. As mentioned above, whole image 301 is an image in a range within ±60 degrees of the horizontal and vertical directions. Because the maximum viewing angle of camera 101 is 30 degrees, all areas of the whole image can not be viewed at one time. Thus, whole image 301 is taken in by a pickup repeated several times, as shown in FIG. 4. Since the area taken in at one time is within a range of a viewing angle of 30 degrees, the whole area 301 is divided into areas that can be viewed within 30 degrees. Thus, the whole image is divided into 16 areas, i. e. four divisions in the vertical and horizontal directions, respectively, as shown in FIG. 4. Then, the whole image 301 can be taken in by an image pickup repeated 16 times.

Figure 5:
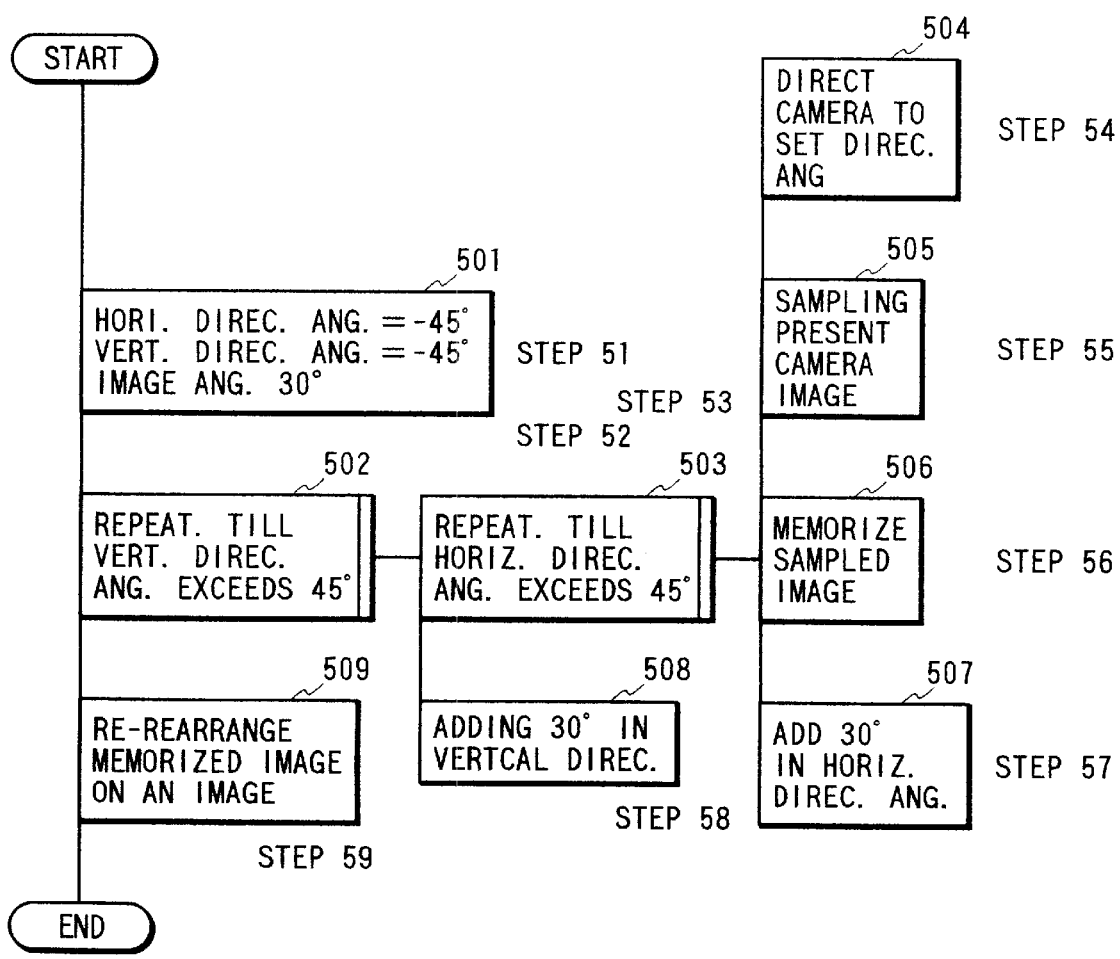
FIG. 5 is a flow chart of operations for obtaining an image in accordance with the present invention.

A processing flow chart for taking in images of 16 areas is shown in FIG. 5. Control section 106 sets as an initial setting the vertical and horizontal directions to be −45 degrees and a viewing angle to be 30 degrees; this is (step 51) 501. Then, a direction angle is determined by adding 30 degrees to the vertical and horizontal angles; these operations are represented in (step 52) 502, (step 53) 503, (step 57) 507 and (step 58) 508. Control section 106 transmits information indicating the determined direction angle and the viewing angle to camera control section 103, and camera control section 103 sets the direction angle and the viewing angle of the universal head 102.

Universal head 102 moves according to the determined viewing angle and viewing direction in (step 54) 504. Universal head 102 returns information indicating that the direction angle and viewing angle are accurately set when arriving at the predetermined direction angle and the viewing angle. Camera control section 103 sends a signal for ending the setting to control section 106 when a signal for ending the setting comes from universal head 102. Control section 106 samples an image in response to a signal sent from camera control section 103 to sampling section 104 in (step 55) 505. At this time, sampling section 104 samples images from camera 101 consisting of 640*480 pixels of RGB 8 bits per pixel. Control section 106 memorizes a set of images sampled in the whole image memory section, a direction angle of the camera and a viewing angle in (step 56) 506. The above sampling processing is carried out for all 16 divided areas. When all images are taken in, control section 106 memorizes a set of sampled images representing the whole image consisting of 640*4,480*4 dots in the whole image memorizing section 107 by referring to a direction angle of each image in (step 59) 509.

Sampling of the camera images will be explained in the following. In this system, image signals of the NTSC system are input in sampling section 104 from the camera through the video line. Sampling section 104 samples images in synchronism with the input image signals. In general, since images are input using the interlace method, two fields are obtained in two samplings to sample one image. At first, the first field sampling is done, and it is memorized in the image memory area in sampling section 104. At this time, the amplitude of the image signal is digitized in 256 gradations for each of RGB colors and the image is sampled at 320 dots in the horizontal direction and 240 dots in the vertical direction. Next, the sampling of the second field is carried out. The sampled image of the second field is input between sampled images of the first field to obtain an image of 640*480 dots and RGB colors each being 8 bits. Some concrete examples of this sampling method are presented in detail in "Indigo Video Manual", Silicon Graphics Co.

Acquisition of camera information will be explained in the following. Control section 106 acquires present information indicating the viewing angle and direction of camera 101 from camera control section 103. Motorized universal head 102 of this system always memorizes and controls the horizontal and vertical directions and the viewing angle of camera 101. When control section 106 requests camera control section 103 to issue information concerning camera 101, camera control section 103 requests universal head 102 to issue this information. Universal head 102 returns the present viewing angle, and the horizontal and vertical direction angles that are memorized therein, to camera control section 103. In addition, camera control section 103 returns the values of the present direction angle and viewing angle from universal head 102 to control section 106. By using the above method, control section 106 recognizes the values of the present viewing angle and direction angle of camera 101.

Calculation of the present position of the camera image will be explained in the following. From the information concerning camera 101, the camera position on the whole image is calculated. Control section 106 gives camera position detecting section 109 camera information obtained from camera control section 103 to let the camera position detecting section calculate the camera position on the whole image. Camera position detecting element 109 calculates the camera position using the following algorithms, where the camera information obtained from camera control section 103 includes horizontal direction angle v, vertical direction angle h, and the viewing angle a.

Figure 6:
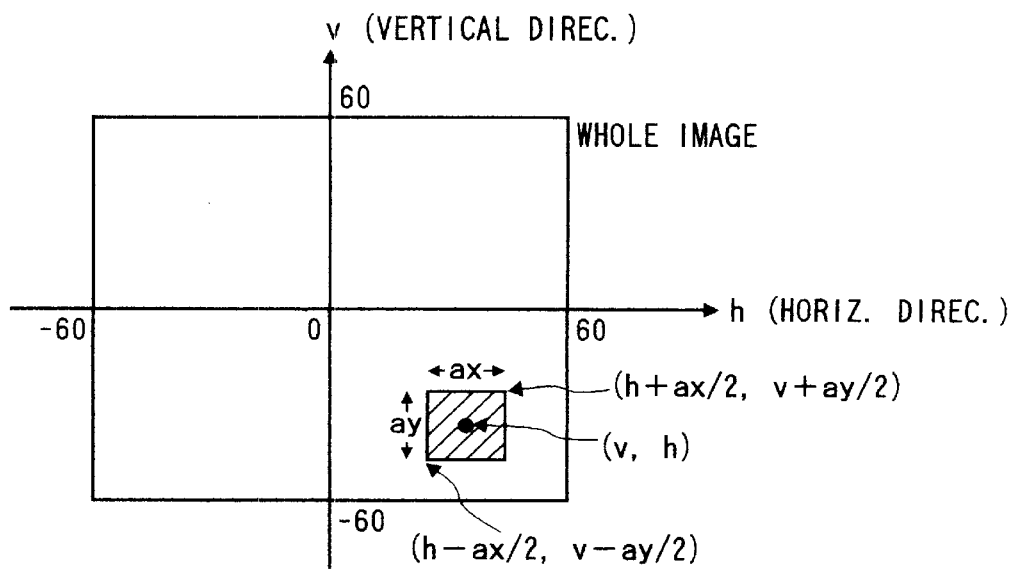
FIG. 6 is a diagram which shows the relationship between the whole image and the camera image using the angle coordinate system of the present invention.

FIG. 6 shows the relationship between the whole image and the present camera image in the system of coordinates. The image of camera 101 can be represented in the rectangle having points (v, h) in the center and widths (ax, ay) in the vertical and horizontal directions in the system of coordinates as shown in the figure. Lower left coordinates in this rectangle are (h−ax/2, v−ay/2) and upper left coordinates are (h+ax/2, v+ay/2).

Figure 7:
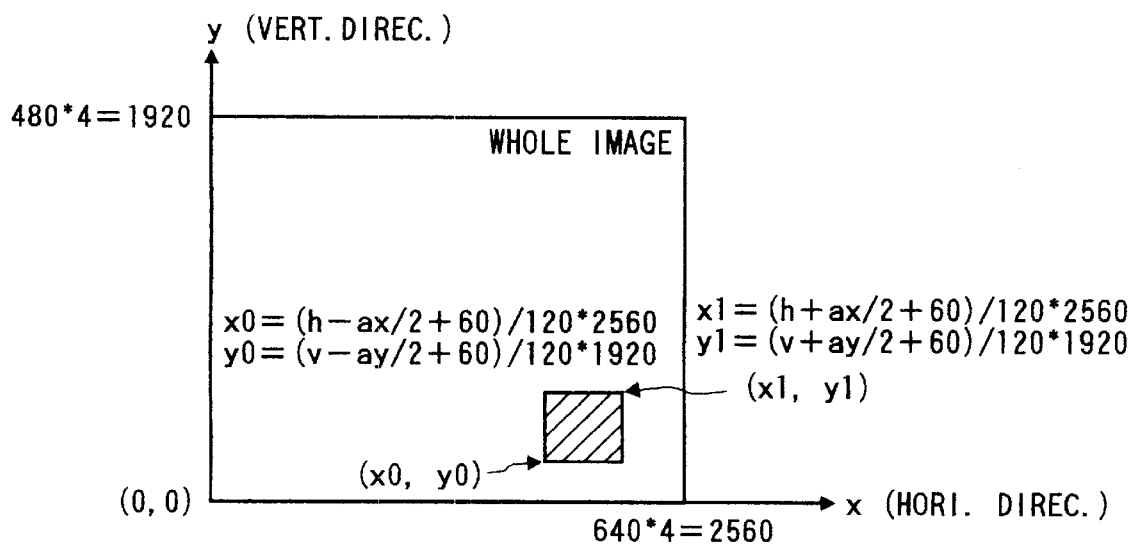
FIG. 7 is a diagram which shows the relationship between the whole image and the camera image in a pixel coordinate system according to the present invention.

FIG. 7 represents a picture of the above system of coordinates using a system of pixel coordinates. In this system of coordinates, the origin is in the lower left, and units in the vertical and horizontal directions are represented by dots. The coordinates of display area 801 in this system are determined at last. Since some distortions, such as enlargement at the ends of images, etc. may occur due to lens characteristics in the coordinates of angles and pixels, it is necessary to use the non-linear characteristic formulae of a lens. In this example, the linear relationship is supposed to show an approximate position at first. Therefore, in this example, the coordinates of (V, H) in the coordinate system are projected to coordinates (X, Y) of the pixel using the following functions.

$$X=(V+60)/120*2560$$

$$Y=(H+60)/120*1920$$

Thus, the picked up rectangle is projected to a rectangle as (xo, yo)–(x1, y1), where $$xo=(h-ax/2+60)/120*2560, yo=(v-ay/2+60)/120*1920,$$

$$x1=(h+ax/2+60)/120*2560, y1=(v+ay/2+60)/120*1920$$

Camera position detecting section 109 returns the calculated values to control section 106.

Then, processing for displaying the area image viewed by a camera will be explained by way of example with reference to display screen 110 of FIG. 8. In this example, the image of camera 101 is displayed on a system having an origin of coordinates (CX, CY) and a width of CW dots and height of CH dots. Control section 106 expands or contracts the image of the 640*480 dots sampled in sampling section 104 to an image having a width of CW dots and a height of CH dots. The magnification is of a width of CW/640 and a height of CH/480. Control section 106 gives instructions to display section 105 so as to display the camera image that was changed to the CW dots and CH dots with respect to the origin CX and CY. Display section 105 displays the expanded image or contracted image at the position of (CX, CY) on the display screen 110.

In the above, displaying of digital-sampled images has been explained. As a method of displaying camera images, it is possible to synthesize computer images and NTSC signals from camera 101 by using a superimposer. Now, processing for displaying the whole image will be explained by way of the display screen 110, shown in FIG. 8. In this example, the whole image is displayed in an area having origin coordinates (GX, GY) and a width of GW dots and a height of GH dots. Control section 106 enlarges and contracts the image of the 2560*1920 dots sampled in sampling section 104 to an image of a width of GW dots and a height of GH dots. The magnification is for a width GW/2560 and height GH/1920. Control section 106 instructs display section 105 to display the camera image of the GW dots and GH dots with reference to the origin GX and GY. Display section 105 enlarges and contracts the image with reference to the position of (GX, GY) on the display screen 110 to display image 802.

The manner of displaying a rectangle of the camera image area on the whole image will be explained. Among displayed images 110 of FIG. 8, rectangle 801 indicating the present position of camera 101 is displayed on the whole image 802. Control section 106 converts the rectangle represented by a camera position (x0, y0)–(x1, y1) that was calculated by camera position detecting section 109 to coordinates (X0, Y0)–(X1, Y1) on display screen 110 thereby to actually display the whole image 802.

Because whole image 802 is enlarged or contracted at a magnification having a width GW/2560 and height GH/1920 as described before, values output by camera 101 in the displaying area 801 are enlarged at the same magnification. In addition, it is necessary to move in parallel by the extent of displaying position (GX, GY) of camera 101. From the above mentioned points, the following calculation is carried out. (X0, Y0)–(X1, Y1) is calculated as follows.

$$Xo=xo*GW/2560+GX, Yo=yo*GH/1920+GY,$$

$$X1=x1*GW/2560+GX, Y1=y1*GH/1920+GY$$

Figure 8:
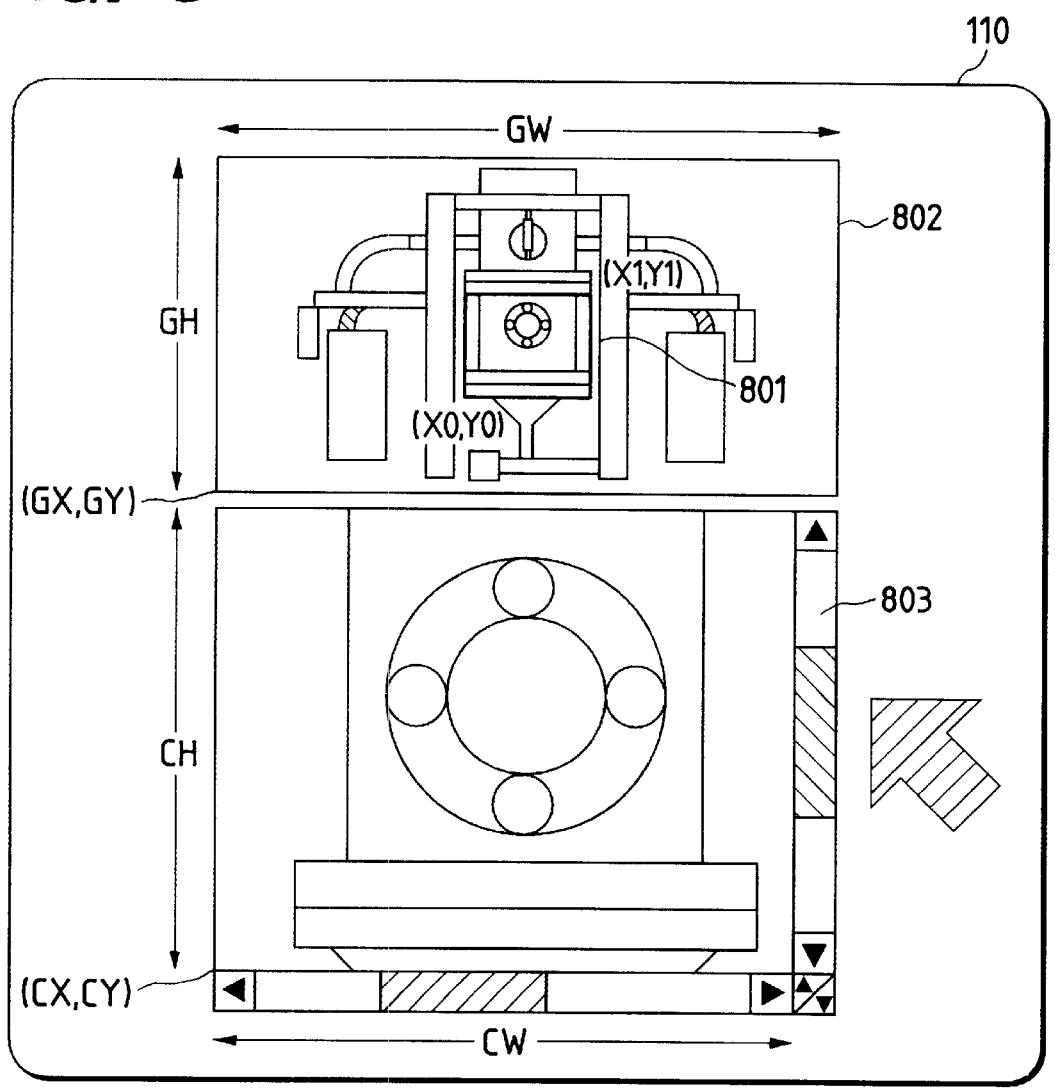
FIG. 8 is a diagram of a sample of a screen display according to the present invention.

Control section 106 displays rectangle 801 on the whole image 802 as shown in FIG. 8 through display section 105.

Figure 2:
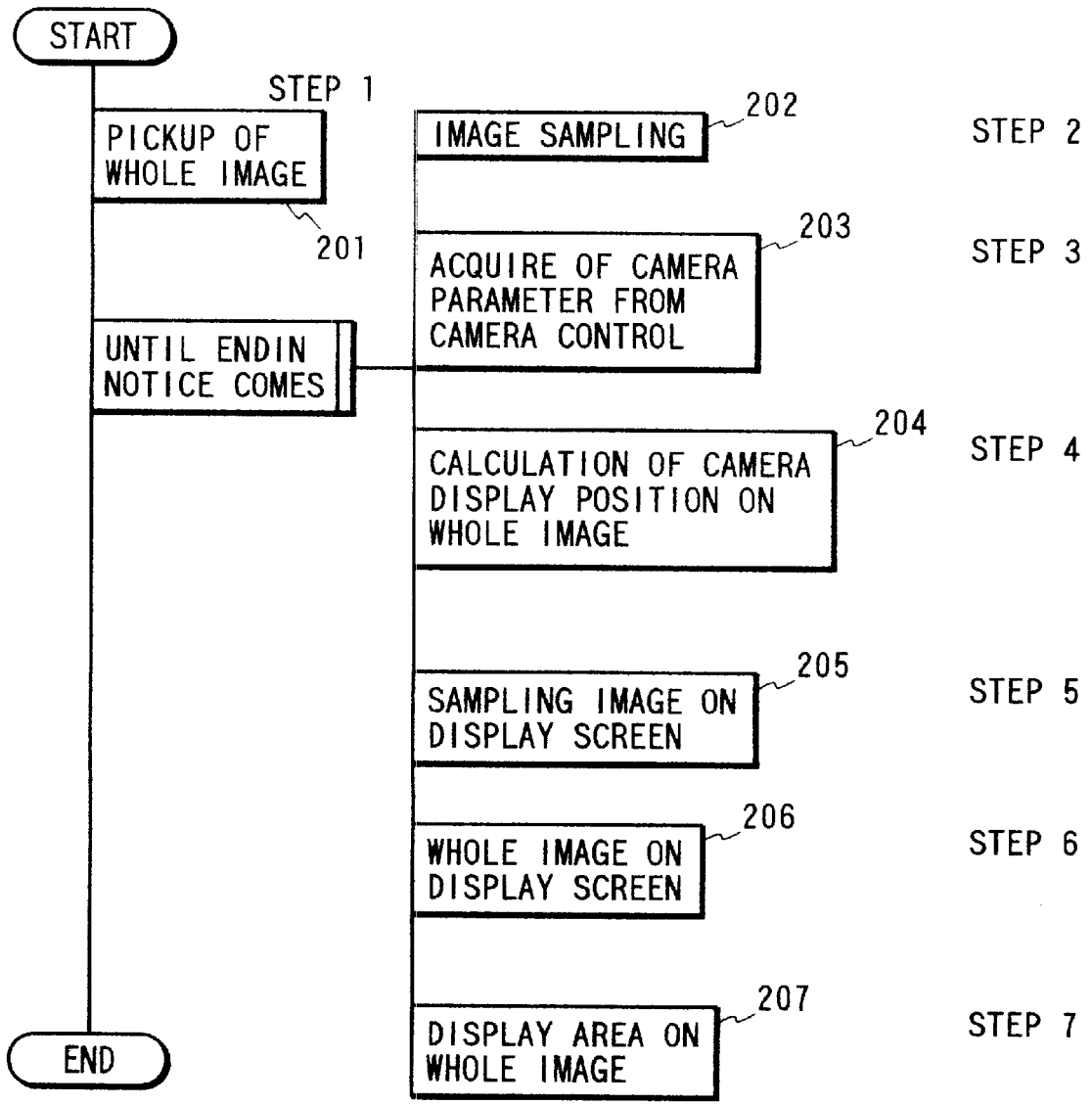
FIG. 2 is a flow chart of the operations for displaying camera images in accordance with the present invention.
Figure 9:
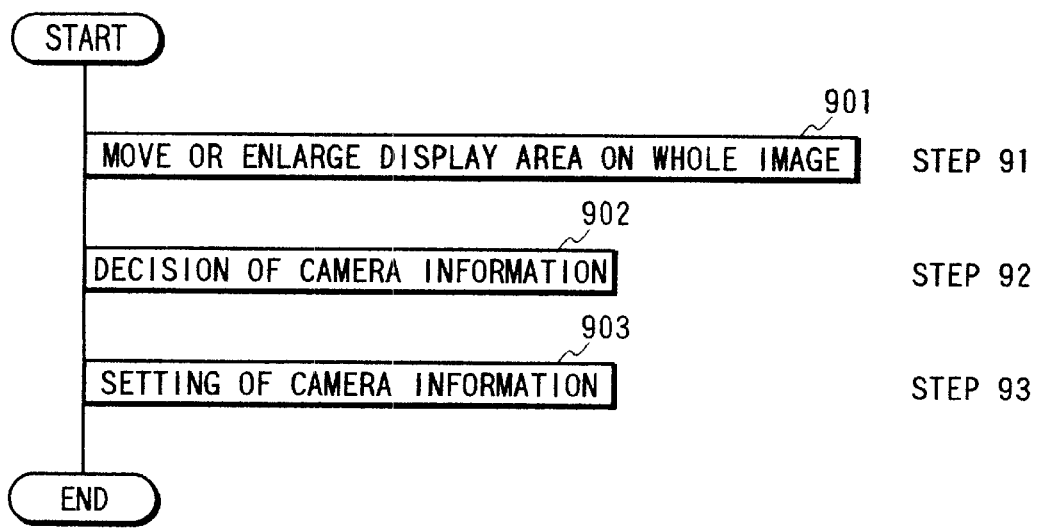
FIG. 9 is an flow chart of operations for editing on the whole screen in accordance with the present invention.

The above explanation provides a description of the detailed contents of the processing flow chart shown in FIG. 2. The manner of displaying the display area 801 viewed by camera 101 has been explained. A control method will be described for controlling camera 101 to view the specified area on the whole image in such a manner that the user directly picks up display area 801 on the whole image and display area 801 is moved, enlarged and contracted. An outline of the flow of processing of this control method will be explained by using FIG. 9. Area display 801 is indicated on display screen 110. Area display 801 is part of the whole image 802, and present area 803 represents the present area that the camera is viewing on the whole image.

Display area 801 on the whole image 802 is selected by using input part 108 in (step 91) 901. By moving, enlarging or contracting display area 801, the area to be viewed is specified by camera 101. This specified area is maintained in control section 106. From the coordinates of the rectangle 801 on the whole image, which is specified in the previous step, control section 106 calculates and determines camera information, including a pan angle and a viewing angle for picking up display area 801 by using camera position detecting section 109 so as to pick up display area 801 in (step 92) 902. In (step 93) 903, control section 106 supplies the camera information calculated in the former step to camera control section 103 and controls camera 101.

Figure 10:
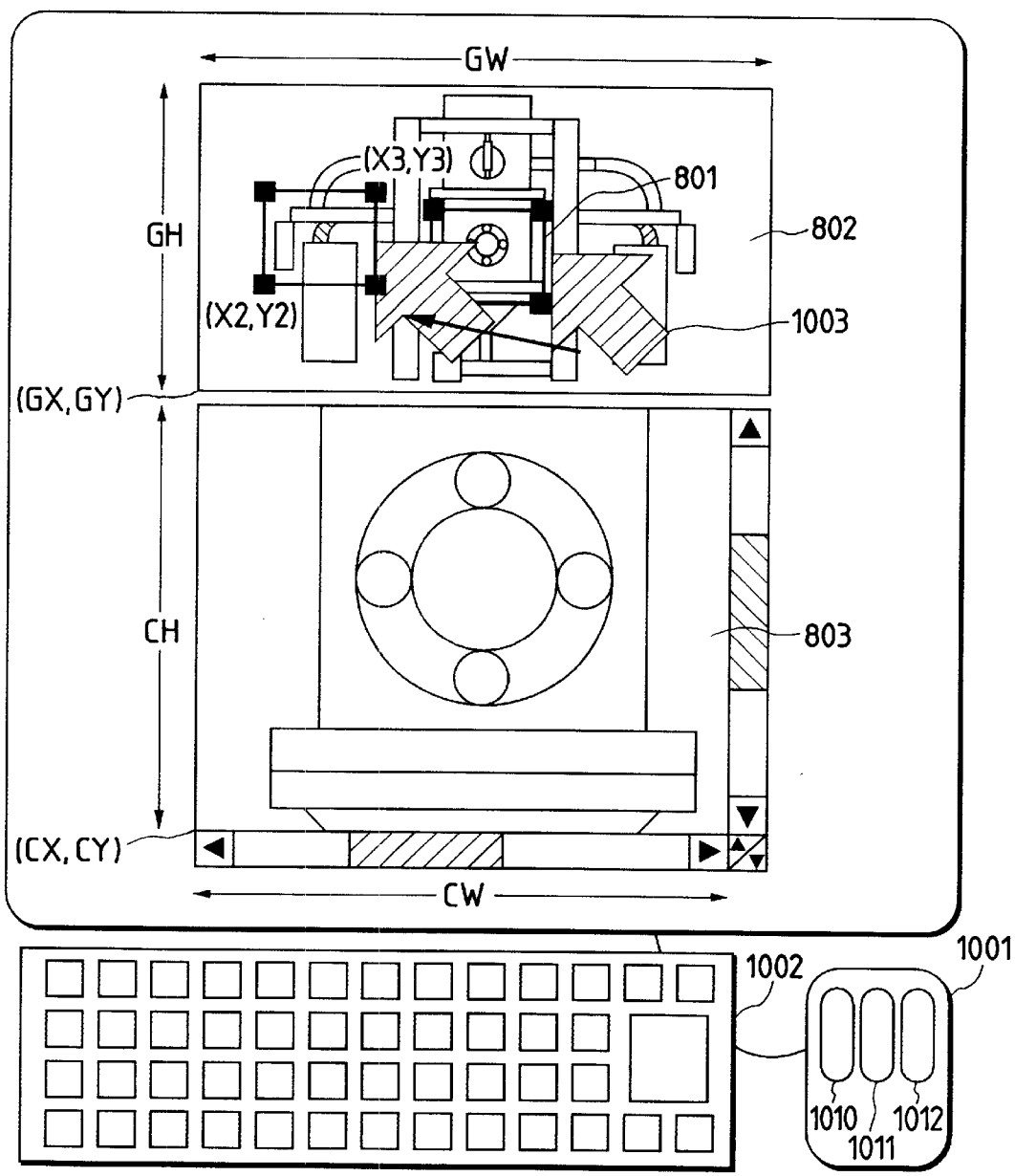
FIG. 10 is a diagram of a sample of a screen display at the time of editing according to the present invention.

By using FIG. 10, the method of inputting area 801 on the actual whole screen 802 will be explained. Input section 108 is composed of a mouse 1001 and a keyboard 1002. The tip of the arrow pointer (cursor) 1003 displayed on display screen 110 of FIG. 10 indicates the present position of mouse 1001. Here, an input method using mouse 1001 will be explained. Three input buttons, including left button 1010, middle button 1011 and right button 1012, are provided on mouse 1001. Input can be effected by pressing down and separating the input buttons. The state changes resulting from shifting up and pushing down the buttons, the movement of the mouse, the kind of pressed buttons (left button 1010, middle button 1011 or right button 1012) and moving quantity (Δx, Δy) of the mouse are input from mouse 1001. Control section 106 memorizes the present position of mouse 1001 and determines the position of mouse 1001 by adding the movement quantity (Δx, Δy) from mouse 1011 to the previous position. The first position of mouse 1001 is the point (0,0). Control section 106 controls display of pointer 1003 on display screen 105 so that the tip of pointer 1003 is displayed at the calculated position of the mouse 1001. In addition, control section 106 determines the operation of the system in accordance with a change of the input state and the identity of the input buttons being actuated.

Mouse 1001 selects the displayed rectangle. The user can put the tip of pointer 1003 on the frame line of camera display area 801 on the whole screen using mouse 1001 so that the display area 801 is selected by shifting up the left button 1010. Control section 106 refers to coordinates (X0, Y0)–(X1, Y1) of display area 801 displayed on the whole screen upon receipt of the input that left button 1010 was shifted up on mouse 1001 to determine the existence of the cursor on the frame line. When the left button 1010 of mouse 1001 is on the frame line, control section 106 interprets that display area 801 was selected. If the button is not on the frame line, nothing is done. When the frame line is selected, control section 106 displays control points at the respective corners of the display area 801, as shown in FIG. 10, so as to show that the display area 801 was selected by the user. Because display area 801 may be changed later, displaying of display area 801 in response to present camera information is temporarily stopped. A restart of this function is performed after camera information is set in (step 93) 903.

The user selects the control points and the frame line using mouse 1001 again. The user specifies the area to be viewed in with camera 101 by moving and enlarging the display area 801. When a frame line is selected and mouse 1001 is moved, display area 801 can be moved. When control points are specified by mouse 1001 and moved, the display area 801 is enlarged.

Figure 11:
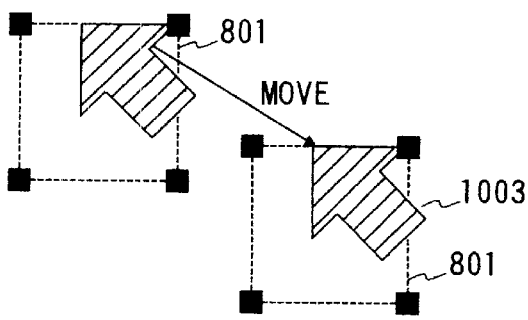
FIGS. 11(1) and 11(2) are diagrams showing examples of editing at the time of panning or zooming with a camera according to the present invention.
Figure 11:
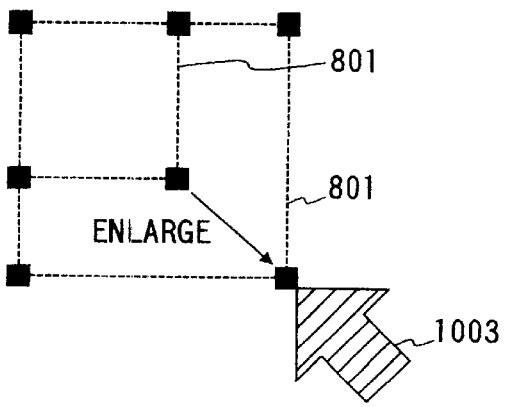

A case where display area 801 is moved will be explained by using FIG. 11(1). When the left button 1010 is pushed down with the cursor on the frame line rather than on the control points of the display area 801 being selected by mouse 1001 as shown in FIG. 11(1), control section 106 judges this as a movement. When the user moves mouse 1001, keeping the left button 1010 down, control section 106 moves display area 801 by the same amount as that of the movement of the mouse 1001. This is done by adding the quantity of movement of mouse 1001 to rectangular area (X0, Y0)–(X1, Y1). Then, it looks as if display area 801 being moved as is attached to pointer 1003, as shown in FIG. 11(1). When the user stops pressing the left button 1010, an input indicating release of the left button 1010 is supplied from mouse 1001 and control section 106 stops the movement on the display.

The case where display area 801 is enlarged and contracted will be explained by using FIG. 11(2). When left button 1010 is pushed with the control point of the display area 801 being selected by mouse 1001, as shown in FIG. 11(2), control section 106 judges this to be an enlargement or contraction. When the user moves mouse 1001, keeping the left button 1010 down, control section 106 moves the selected control points by the same quantity as that of the movement of the mouse 1001. This is done by adding the amount of movement of the mouse 1001 to the coordinates that correspond to each of the control points of rectangular area (X0, Y0)–(X1, Y1). In FIG. 11(2), there is shown an example of enlargement in which, using pointer 1003, display area 801 looks as if it were enlarged. When the user stops pressing the left button 1010 down, an input is supplied from mouse 1001 and control section 106 stops enlarging and contracting operations.

After setting display area 801 at the desired position and to the desired size, right button 1012 is pushed to determine the position and the size. When the user moves, enlarges or contracts display area 801 using mouse 1001 according to the above method, and when he pushes and hands off right button 1012 on display area 801, the area to be viewed by camera 101 is determined. When the user selects the right button 1012 in selected display area 801, control section 106 recognizes the end of editing of display area 801. Then, displayed control points are erased so that selected display area 801 is changed to a non-selected area. In the above explanation, the user points to display area 801, and he moves, enlarges and contracts the area, so that the pickup direction of the camera is specified. In addition to the above method, a new area may be specified on the whole area by using pointer 1003, and it is possible to specify the area that is picked up next by the camera.

Figure 12:
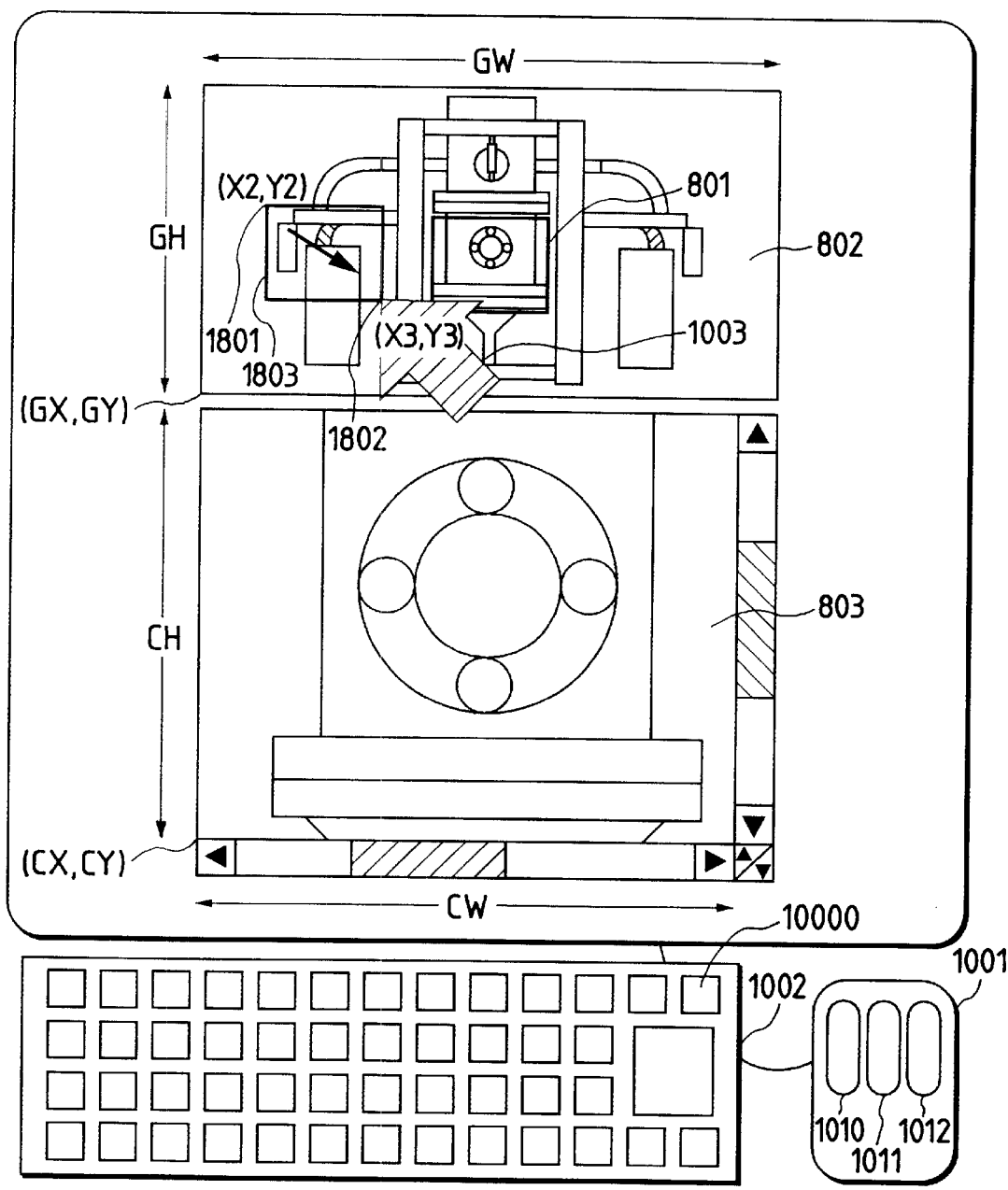
FIG. 12 is a diagram which shows a system by which a camera display area is directly specified on the whole screen according to the present invention.

This example will be explained by using FIG. 12. When the user presses down middle button 1011 of mouse 1001 with the cursor on the whole screen, control section 106 recognizes that in response to the input, starting point (X2, Y2) 1801 for specifying an area on the coordinates on the whole screen is set in accordance with the information of the coordinate value of the mouse 1001 and that middle button 1011 was pressed.

The user keeps middle button 1011 of the mouse 1001 down and drags it to specify point (X3, Y3) 1802 of the end of the area to be picked up by camera 101. Information of the coordinates of mouse 1001 and its movement is input in control section 106 from mouse 1001. Control section 106 displays with expanding rectangle 1803, the diagonal of which extends from coordinate 1801 where middle button 1011 of mouse 1001 was pushed through to coordinate 1802 to which the mouse was dragged from point 1801. When the area is specified, the user releases the middle button 1011 of the mouse 1001. Control section 106 recognizes the new area to be taken in by the camera when information of the coordinates and the pressing down of middle button 1011 from the mouse 1001 is input. In addition, when the right button 1012 of mouse 1001 is pressed down and separated, control section 106 judges that a new area specified by the user has been determined.

Next, the determination of camera information on the basis of information as to input area 801 will be explained. Control section 106 calculates camera information (panning angle, viewing angle) for operating the universal head 102 of camera 101. The calculation is performed by using camera position detecting section 109, based on coordinates (X2, Y2)–(X3, Y3) on display area 110 of the area to be taken in next by camera 101 in input section 108 on the whole image 802. Camera position detecting section 109 calculates coordinates by using the opposite operation of the method that is used for calculating coordinates on display screen 110, based on the above camera information.

In a case where there are coordinates (x, y) on the screen apparatus, the point is converted into point (p, q) of the pixel coordinate system of the whole screen. The conversion is performed as follows, by referring to the enlargement ratio and display position (GX, GY) of the whole image.

$$p=(x-GX)/(GW/2560), q=(y-GY)/(GH/1920)$$

Then, pixel coordinates (p, q) are converted into points (v, h) of an angle coordinate system as follows.

$$v=p/2560*120-60, h=q/1920*120-60$$

Camera position detecting element 109 calculates points (V3, H3) and (V4, H4) that convert each of two points (X3, Y3) and (X4, Y4) on the whole screen using the above two conversion expressions. Camera position detecting section 109 determines a pan angle (Px, Py) and a viewing angle (ax, ay) that controls camera 101 by using the value of this angle coordinate system.

$$Px(\text{horizontal direction angle})=(V3+V4)/2$$

$$Py(\text{vertical direction angle})=(H3+H4)/2$$

$$ax(\text{horizontal angle of view})=(V4-V3)$$

$$ay(\text{vertical angle of view})=(H4-H3)$$

Camera position detecting element 109 returns calculated camera information to the control section 106.

Now, the manner of setting camera information will be explained. Control section 106 gives camera control section 103 the camera information for calculating the pan angle (Px, Py) and the viewing angle (ax, ay) and requests camera control section 103 to control universal head 102. Camera control section 103 sets camera information received from control section 106 through the control line at universal head 102. Universal head 102 will move, according to camera information specified by camera control section 103. As mentioned above, when universal head 102 arrives at the predetermined pan direction and viewing angle, universal head 102 sends an end report to camera control section 103 through the control line. When the camera setting end report is received from universal head 102, camera control section 103 will send the setting end report to control section 106. By virtue of this reporting function, the console and camera 101 can operate in synchronism.

Since the pickup range of camera 101 depends on the hardware of camera 101, all areas that the user may have specified cannot be taken in by the camera 101. For example, as for camera 101 of this system, the maximum viewing angle is 30 degrees and the minimum viewing angle is 5 degrees. Therefore, even if an area having a viewing angle which exceeds 30 degrees is specified, camera 101 cannot pick up the entire area. Therefore, when the user tries to specify an area using mouse 1001 that can not be picked up, a warning is displayed or control is performed so as not to exceed the possible pickup area.

Next, an example in which the whole image is viewed as specified by the user will be explained. In this example, when the user specifies memorization of the whole image, the whole image is taken in at that time. If the whole image is taken in only at the time of start up of the system, the situation of the actual site and the memorized image will become considerably different, as time passes. In this example, when the user specifies that the whole image is to be picked up, the latest image of the site is memorized.

Figure 13:
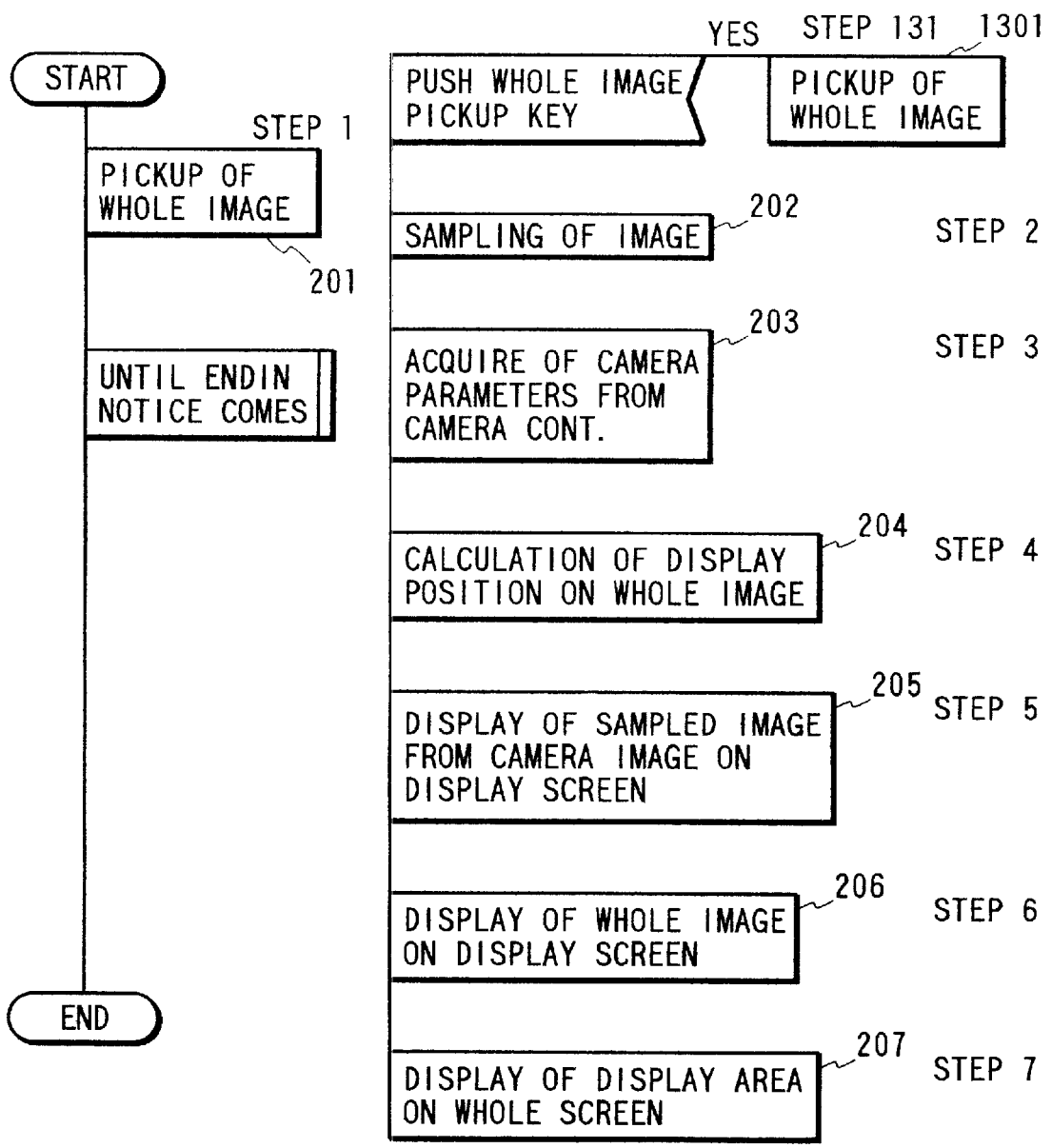
FIG. 13 is a screen display flow chart showing operations of the present invention.

The processing flow chart of this example is shown in FIG. 13. In this processing flow chart, (step 131) 1301 is added to the flow chart of FIG. 2. In this (step 131) 1301, when the user presses the whole image pickup key 10000 on display area 802 of the whole image, the system picks up the same whole image as that of FIG. 2 and renews the whole image memorized in whole image memory 107. The method is the same as in the example mentioned above.

In this system, the whole image can be renewed in response to a change of the system and a change of the state of the system. It is possible to take in the whole image when the user stops watching the area image. In a plant system, the camera image is not always displayed on the screen of the operator. There are a plurality of cameras 101 in the plant, and monitoring is conducted by changing over the cameras 101 used to display the images. In this example, the whole image is taken in and automatically renewed when the user has stopped watching the camera image.

Figure 14:
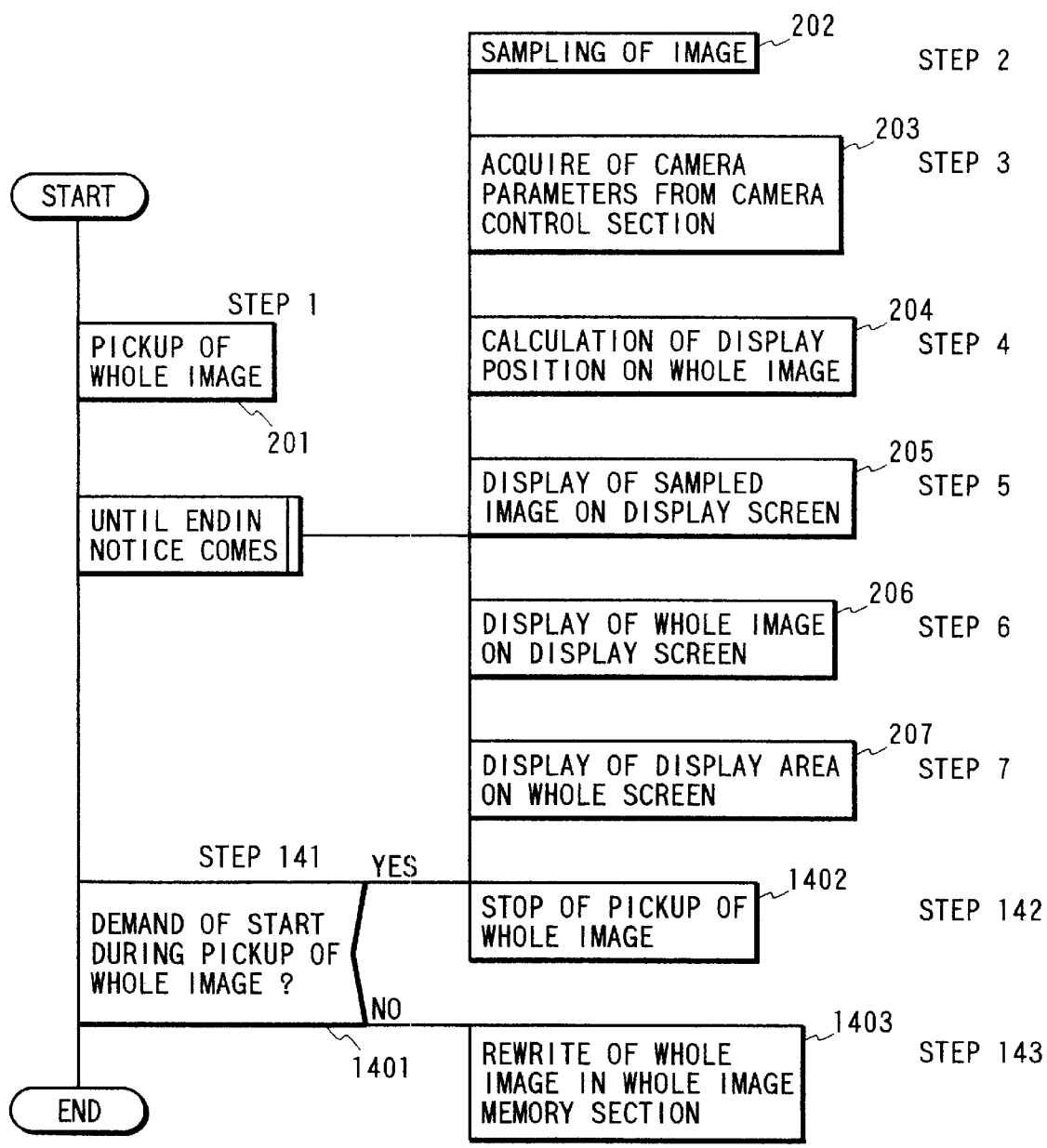
FIG. 14 is a screen display flow chart showing other operations of the present invention.

The processing flow chart of this example is shown in FIG. 14. In this processing flow chart, (step 141) 1401 and (step 142) 1402 are added to the flow chart of FIG. 2. When the user issues a notification to end the display using input section 108, the control section 106 ends the display of the whole image and camera image 803 from (step 2) 202 to (step 7) 207.

When the display is ended, control section 106 renews the whole image of the camera 101 in (step 141) 1401 and (step 142) 1402. In (step 141) 1401, images that are able to be taken in by camera 101 are viewed in the same manner as in (step 1) 201. If the user requests start of display of the camera image, it is necessary to pick up an image of the place at which the user wants to look. In (step 141) 1401, confirming whether the display start requirement from the input device by the user has occurred periodically during introduction of the image, the image is taken in. If there is a requirement for start of the display, pickup of the whole image stops in (step 142) 1402; after stopping introduction of the whole image, then the display is restarted. After taking in the whole image in (step 141) 1401, the whole image memorized in (step 141) 1401 in the whole image memory part 107 is rewritten in (step 143) 1403. In case the user requests a restart halfway, the whole image is disposed in (step 142) 1402, but if the image is taken in until the end, the image is registered in the whole image memory section 107.

By using this system, the whole image can be renewed automatically. An example wherein the whole image and camera area image are displayed by switching will be explained in the following. While two images, i.e. the whole image and the image that is being viewed, were simultaneously displayed in the above examples, in this example, the user refers to the camera image by switching the whole image and the image of camera 101, because there may be a case wherein the whole image is utilized in controlling camera 101 and the camera position become indistinct, and other cases wherein the whole image need not be displayed.

Figure 15:
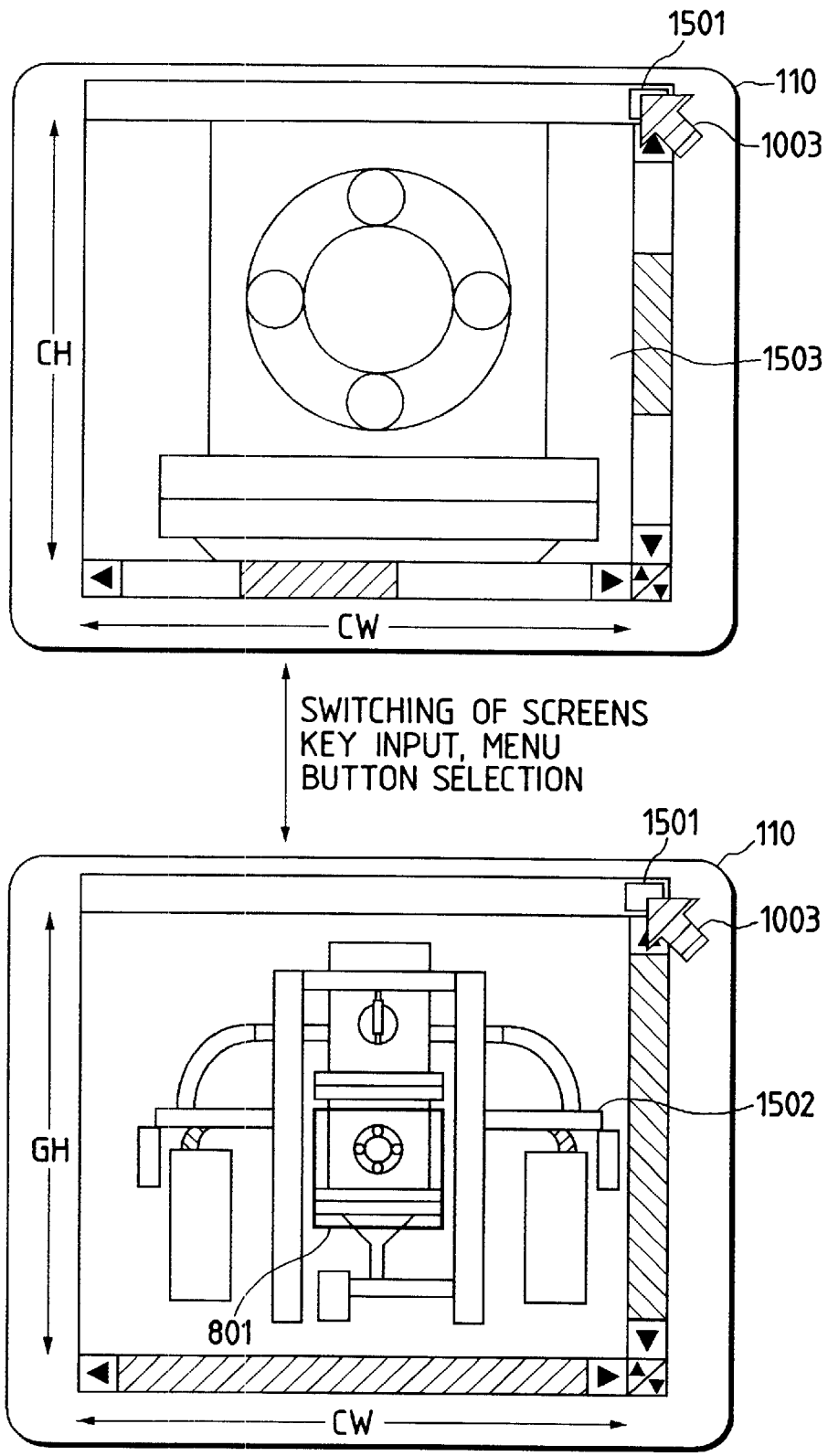
FIG. 15 is a diagram showing an example of a display screen according to the present invention.

The movement in this example will be explained by using FIG. 15. The user looks at image 1503 of camera 101 like display screen 110 in FIG. 15. When the user wants to change a pickup direction with camera 101 or he does not know where to look, the change button 1501 on display screen 110 is pressed using pointer 1003, or the user presses the function key on the keyboard 1002, in the system of this example. Control section 106 detects a demand for the whole screen by the user, and control section 106 stops displaying image 1503 of the camera like display screen 110 below FIG. 15, so as to display whole image 1502. On this screen, display 801 showing the area that is being viewed by camera 101 is displayed. The user can intuitively perceive where camera 101 is directed. Of course, the pickup direction of camera 101 can be set by moving and enlarging display area 801 using pointer 1003 in the same manner as in the first example. If the user wants to look at the actual camera image, while he is looking at the whole image, the present camera image being picked up by camera 101 can be displayed by pressing the change button 1501 in the same manner as in the previous example or by pressing the function key on the keyboard 1002 to stop display of the whole image 1502, as shown in FIG. 15.

Figure 16:
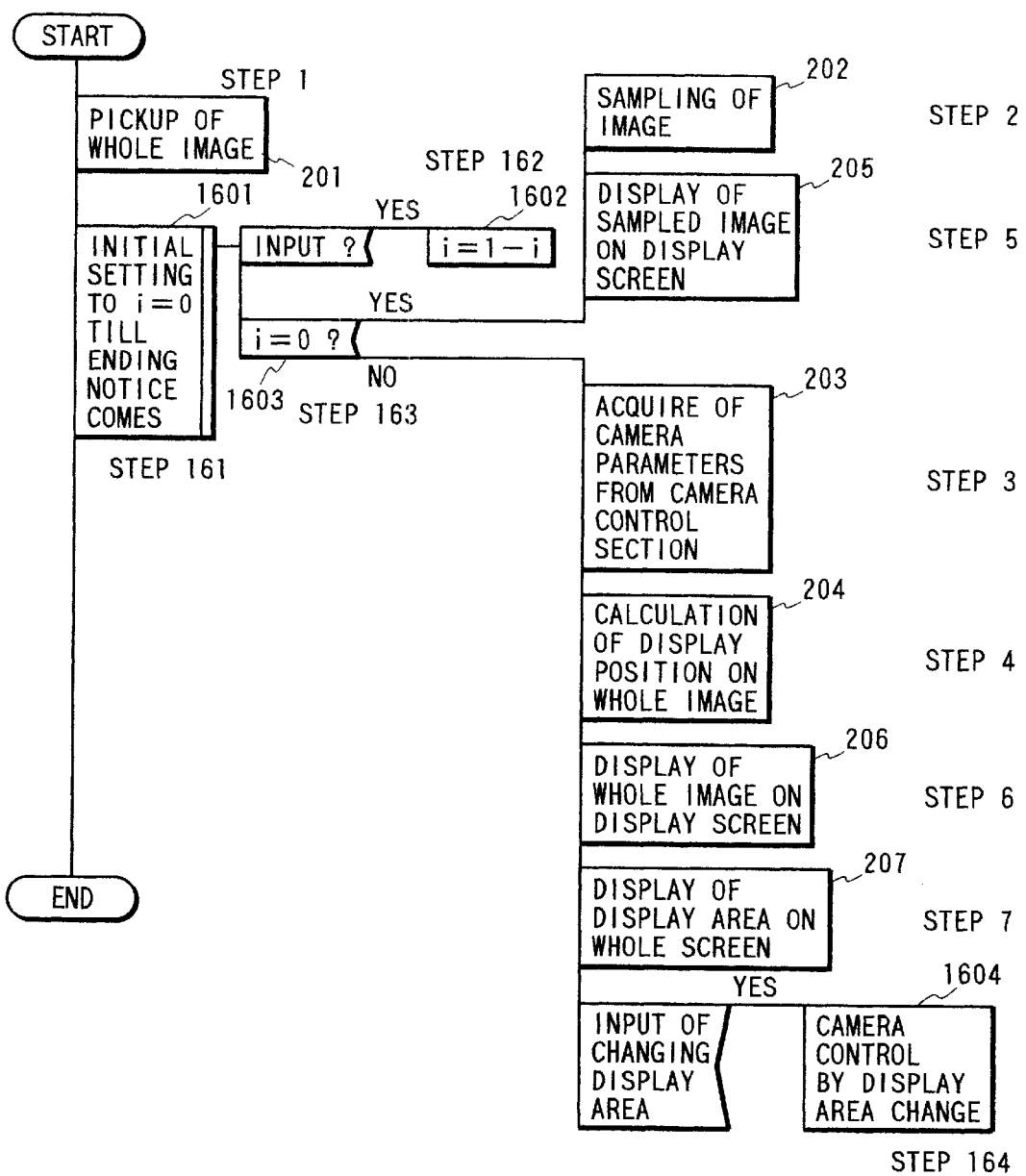
FIG. 16 is a processing flow chart showing operations of the present invention.

The flow diagram of this example is shown in FIG. 16. In this system, processing of FIG. 1 is divided into two parts, including the process (step 2 202 and step 5 205) for displaying the camera image and the process (step 3 203, step 4 204, step 6 206 and step 7 207) for displaying the whole image. Each processing is changed over by the input from input section 108. Change button 1501 on display screen 110 is pressed using the pointer 1003, or the function key is pressed on the keyboard 1002.

Each part of the processing will be explained. The whole image is memorized in the whole screen memory section in (step 1) 201 of the method similar to the foregoing one. Change flag i is initialized to 0 in (step 161) 1601, and (step 2) 202 to(step 164) 1604 are repeated until the end notification comes.

In a case where there is an input due to change button 1501 on display screen 110 being pressed down using pointer 1003, or function key 1 is pressed down on the keyboard 1002, the change flag is changed to 0 or 1 in (step 162) 1602. Inputting using pointer 1003 is performed in such a manner that the user moves pointer 1003 indicating a position of mouse 1001 as an input means to the area of change button 1501 and presses down left button 1010 to give a direction. Control section 106 always monitors the input from the mouse 1001 to determine whether the input position is in the button area. In a case where it is in the button area, an input state indicating that left button 1010 was pressed down is determined. (Step 162) 1602 is performed in response to a determination that when two conditions are met, the user instructed the change-over of the screen. And, control section 106 always monitors the input from keyboard 1002. When an input indicates that function key 1602 was pressed down, (step 162) 1602 is executed.

In (step 163) 1603, control section 106 executes the process of (step 2) 202 and (step 5) 205 for displaying the camera image if the value of change flag i is 0. The process of (step 3) 203, (step 4) 204, (step 6) 206, (step 7) 207 and (step 164) 1604 for displaying the whole image is executed if the value of i is 1. The processing in (step 2) 202 to (step 7) 207 is the same as the example mentioned before.

In a case where the whole image is displayed in (step 3) 203, (step 4) 204, (step 6) 206 and (step 7) 207, the camera image and the whole screen image are handled as if displayed on the same image in the following relations.

GX=CX, GY=CY, GH=CH, GW=CW

In order to change the display area 801 on the whole screen to set camera 101, it is determined whether there is a requirement that display area 801 is to be changed in steps 164 1604, by the same method as the one mentioned above. Camera information is set by quite the same method as (step 91) 901 to (step 93) 903 if there is a change requirement.

By using this example, the whole image and the camera image can be displayed on relatively few display areas, and the display screen can be used efficiently. Now, an example of partial renewal of the whole image will be explained.

Figure 17:
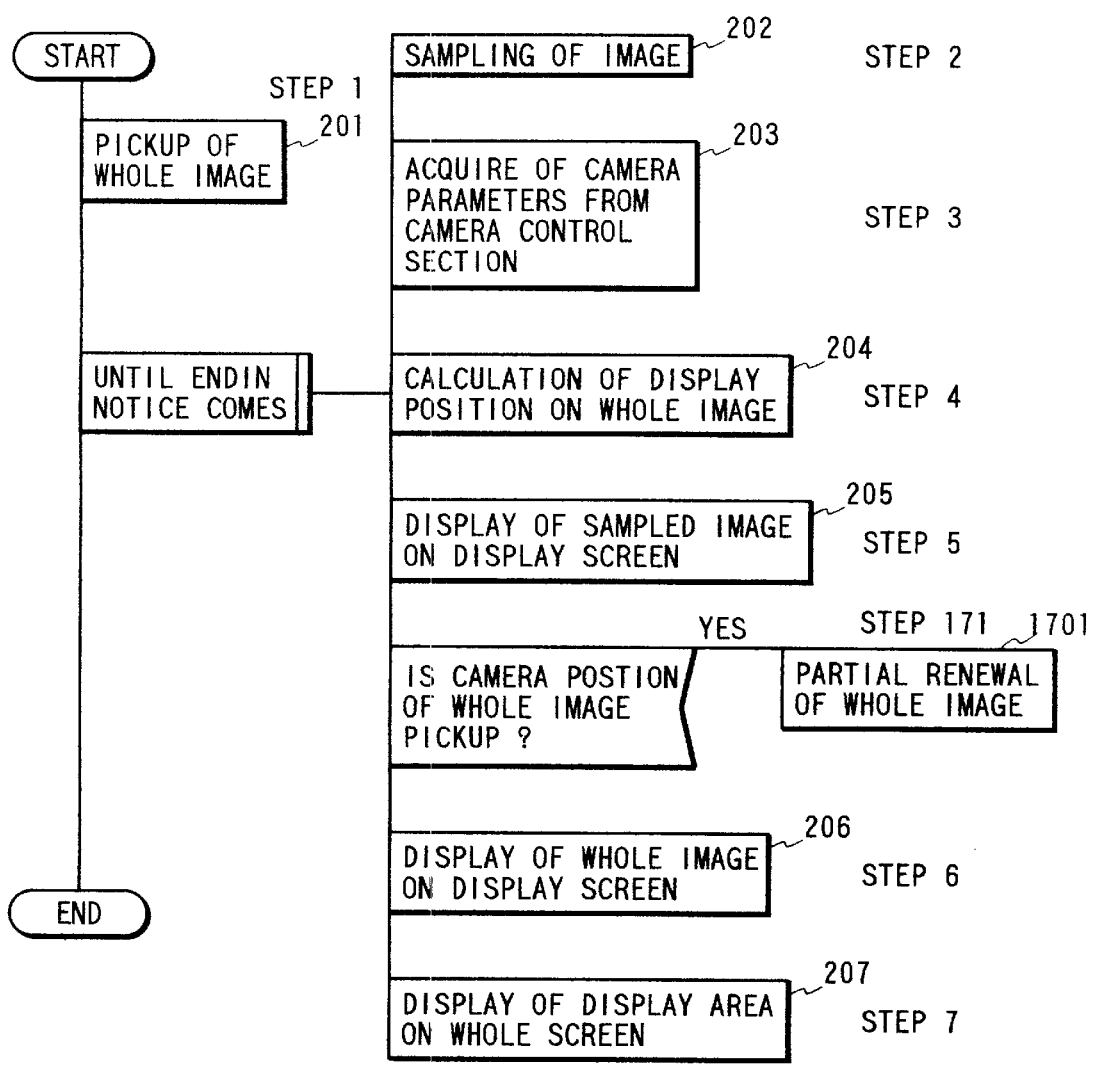
FIG. 17 is a screen display flow chart showing examples of the present invention.

The user operates camera 101, while zooming or panning the camera. The same position as used at the time of taking in the whole image may be employed when operating camera 101. In this example, when the camera image is displayed on a place decided in advance, the corresponding part of the whole image is renewed automatically. The system structure of this example is the same as FIG. 1. However, the processing flow is changed from the flow of FIG. 2 to the flow of FIG. 17. In this processing flow chart, (step 171) 1701 is added to the steps of the first example.

In (step 171) 1701, it is confirmed whether the camera image viewed in (step 2) 202 is at a position (the viewing angle and direction) where the whole image is taken in. The sampling image viewed in (step 2) 202 is used as the whole image. At this time, a part of the whole image is determined on the basis of the viewing angle and direction of camera 101, and only the determined part is renewed. By using this system, the whole image can be renewed step by step automatically. And, in a case where only zooming is carried out without panning, the image at the time of zooming out can automatically be taken in, and the whole image can be naturally taken in.

Now, an example in which the whole display area viewed by another camera will be explained. In the examples explained till now, the whole image is memorized as still images. In this example, by utilizing a combination of two cameras, one of which takes in the whole image and the other is one that the user actually controls, a system by which the whole image and camera image are always renewed is obtained.

Figure 18:
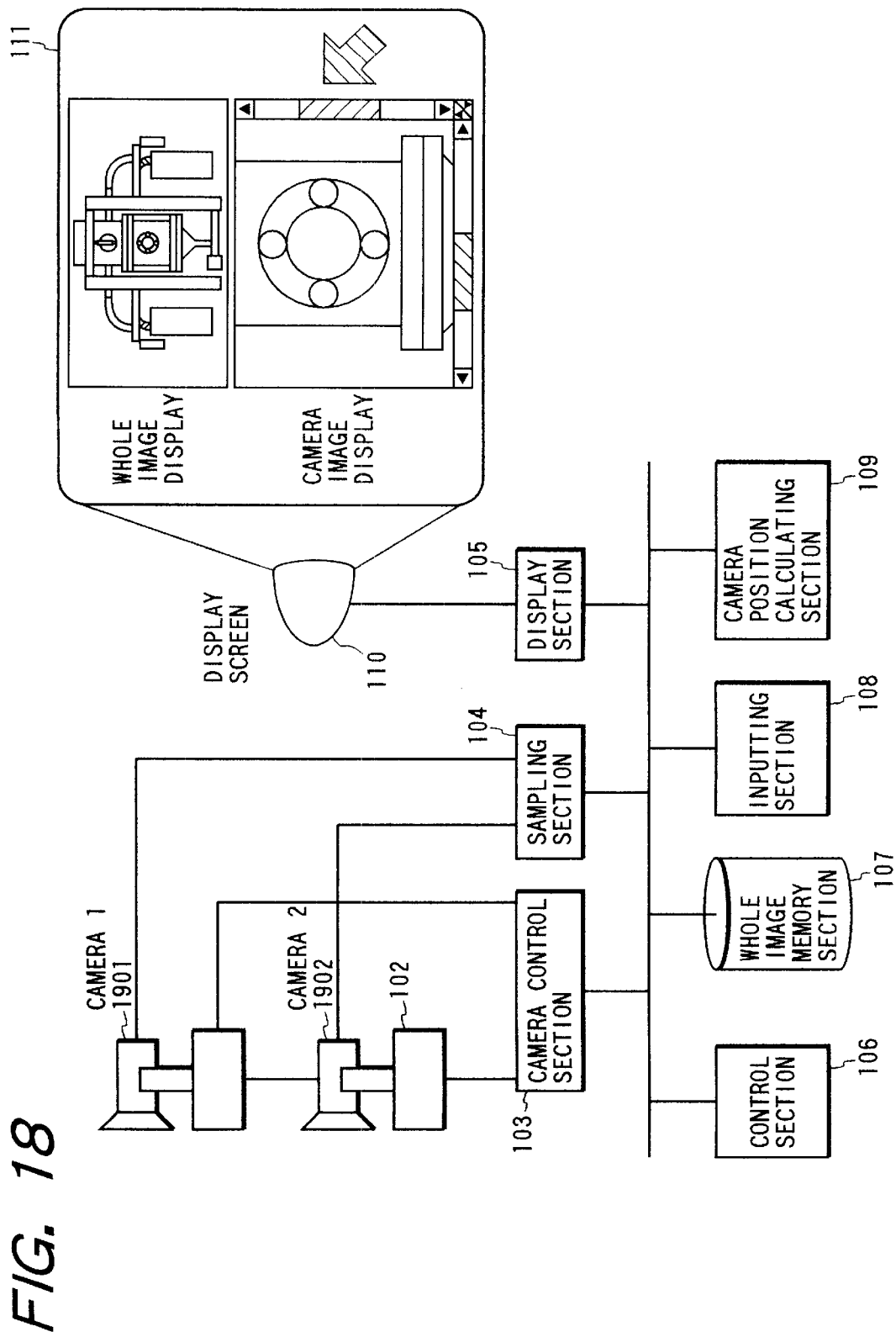
FIG. 18 is a system diagram of the present invention.

The system structure of this example is shown in FIG. 18. In this example, besides camera 1 1901 by which the user can control zooming, etc., camera 2 1902 that picks up the whole image is added. Therefore, camera control section 103 is connected to these cameras by two control lines, and camera control section 103 controls the cameras by changing over the control lines, depending on which camera is controlled. And, sampling section 104 is connected to the image lines of the two cameras.

Depending on which camera image is to be sampled, the video lines are switched to sample the desired image. In addition, it is not necessary to memorize the whole image in this example, unlike the examples explained till now, because display is performed while taking in the whole image. Whole image memory section 107 does not memorize the whole image, but memorizes the relationship of the image from camera 1 1901 and the whole image from camera 2 1902. And, in this example, it is supposed that camera 2 1902 is a fixed camera. Of course, even if camera 2 1902 moves, this example can be realized.

Figure 19:
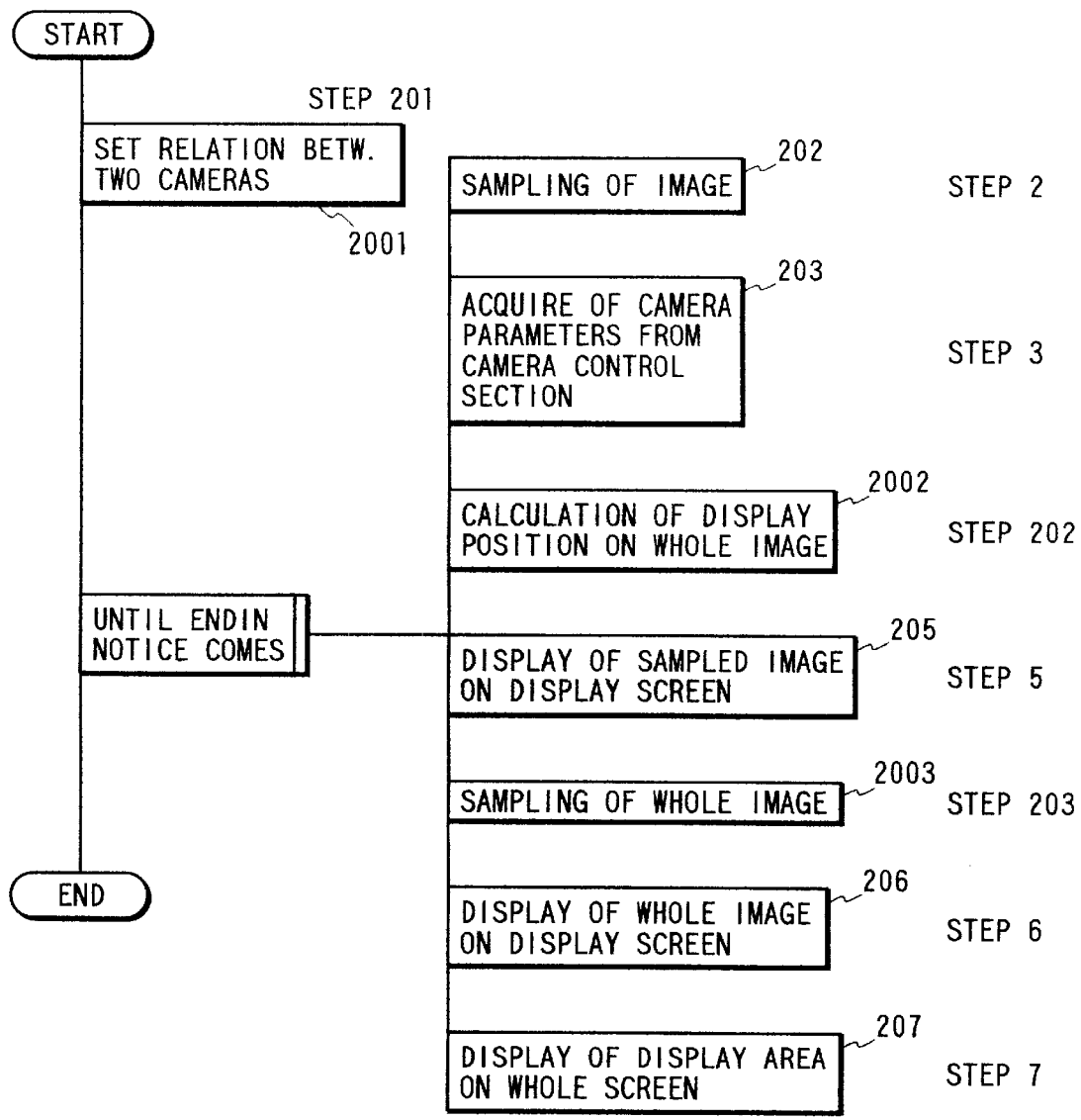
FIG. 19 is a screen display flow chart showing operations of the present invention.

The flow diagram of this example is shown in FIG. 19. Control section 106 sets the relationship of camera 1 1901 and camera 2 1902, and memorizes it in whole image memory section 107, the relationship being measured in advance at the time of the start-up of the system, etc. Then, (step 2) 202, (step 3) 203, (step 202) 2002, (step 5) 205, (step 203) 2003, (step 6) 206 and (step 7) 207 are repeated until the ending notification is issued. By using sampling section 104 and employing the same method as in example 1 in (step 2) 202, the image of camera 1 1901 is sampled. In (step 3) 203, the camera information of camera 1 1901 is acquired by using camera control section 103 with the same method as in the above example.

The displaying position of the present image being taken in by camera 1 1901 on the whole image taken by camera 2 1902 in (step 202) 2002 is calculated on the basis of the relationship of the two cameras memorized in whole image memory section 107 in (step 201). The camera image sampled in (step 2) 202 is displayed on display screen 110 using the same method as in (step 5) 205. Control section 106 samples the image of camera 2 1902 by using sampling section 104 in (step 203) 2003. This sampling method is the same as the method used in (step 2) 202.

Sampling is executed by switching camera 1 1901 or camera 2 1902 in sampling section 104. In (step 6) 206, the same method as in example 1 is used. The position on the whole image calculated in (step 202) 2002 on the whole image displaying the image sampled in (step 5) 205 is shown using the same method as in the above example. In the process, a step different from that of the forgoing example will be explained in detail.

The positional relationship of the two cameras is defined as follows. This will be explained by using FIG. 20. To define the positional relationship between the cameras, points to be taken by camera 1 1901 (for example, points 2101, 2102 and 2103) are measured to determine which points are taken in by camera 2 1902. The relationship of camera 1 1901 and camera 2 1902 is defined by a method for extrapolating and interpolating optional directions of camera 1 1901.

Figure 20:
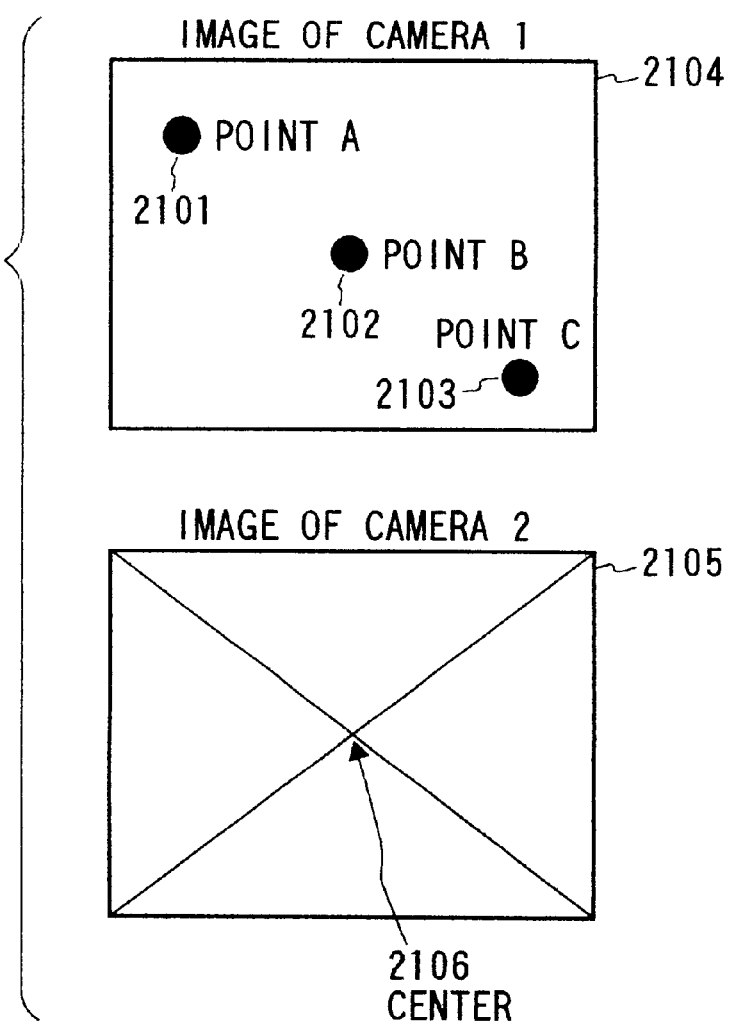
FIG. 20 is a diagram showing an example of a screen display at the time of defining the relationship between the image of a camera 1 and the image of a camera 2.

Camera control section 103 receives an indication of the direction of the center position 2106 of the camera 1 1901 as camera information from universal head 102 of the camera. By indicating the point on camera 2 1902 which coincides with the center point of camera 1 1901, it can be decided how the point on camera 1 1901 is projected on the image of camera 2 1902. For example, three points are checked by the images of camera 1 1901, as shown in FIG. 20. The points on camera 2 1902 are point A ($\gamma 1$, $\delta 1$) 2101, point B ($\gamma 2$, $\delta 2$) 2102, and point C ($\gamma 3$, $\delta 3$) 2103 in the pixel coordinate system. The direction of each camera 1 1901 is ($\alpha 1$, $\beta 1$)2101, ($\alpha 2$, $\beta 2$)2102 and ($\alpha 3$, $\beta 3$)2103. Assuming that $\gamma$ depends on only $\alpha$ and $\delta$ depends on only $\beta$, $\gamma$ is interpolated in the secondary curve $\gamma(\alpha)$ by using $\alpha 1$, $\alpha 2$ and $\alpha 3$. And, $\delta$ is interpolated in the secondary curve $\delta(\beta)$ by using $\beta 1$, $\beta 2$ and $\beta 3$. By this procedure, the position in the pixel coordinate system of camera 2 1902 can be calculated based on the directions of camera 1 1901.

When taking 3 points that are on the diagonals of the whole image, interpolation precision is fine. In (step 201) 2001, the relational expression of camera 1 1901 and camera 2 1902 is memorized in the whole image memory section 107.

A calculation of the position that camera 1 1901 is in within the whole image is performed as follows. In (step 202) 2002, by using the above conversion expression memorized in whole image memory section 107, the position in the pixel coordinate system on the whole screen is determined from the directions of the camera and the viewing angle that can be acquired from camera control section 103.

If camera 1 1901 points in direction (h, v) and has a viewing angle (ax, ay), the area (x0, y0)–(x1–y1) on the whole screen of display area 801 can be calculated using the following expressions.

$$xo=\gamma(h-ax/2),\ yo=\gamma(v-ay/2),\ x1=y(h+ax/2),\ y1=\gamma(v+ay/2)$$

In (step 7) 207, a rectangle is displayed at the above coordinates on the whole screen.

When controlling the pickup direction of the camera from the whole image, the camera position calculation section calculates the pickup direction of the camera and the viewing angle based on the coordinates of the point on the whole image by using an opposite conversion of the above interpolation expression. By using this example, because the whole image can be always renewed, even in a case there are some changes on the whole screen, a change is immediately picked up on the screen. Now, an example in which the whole image is graphic information will be explained.

Figure 21:
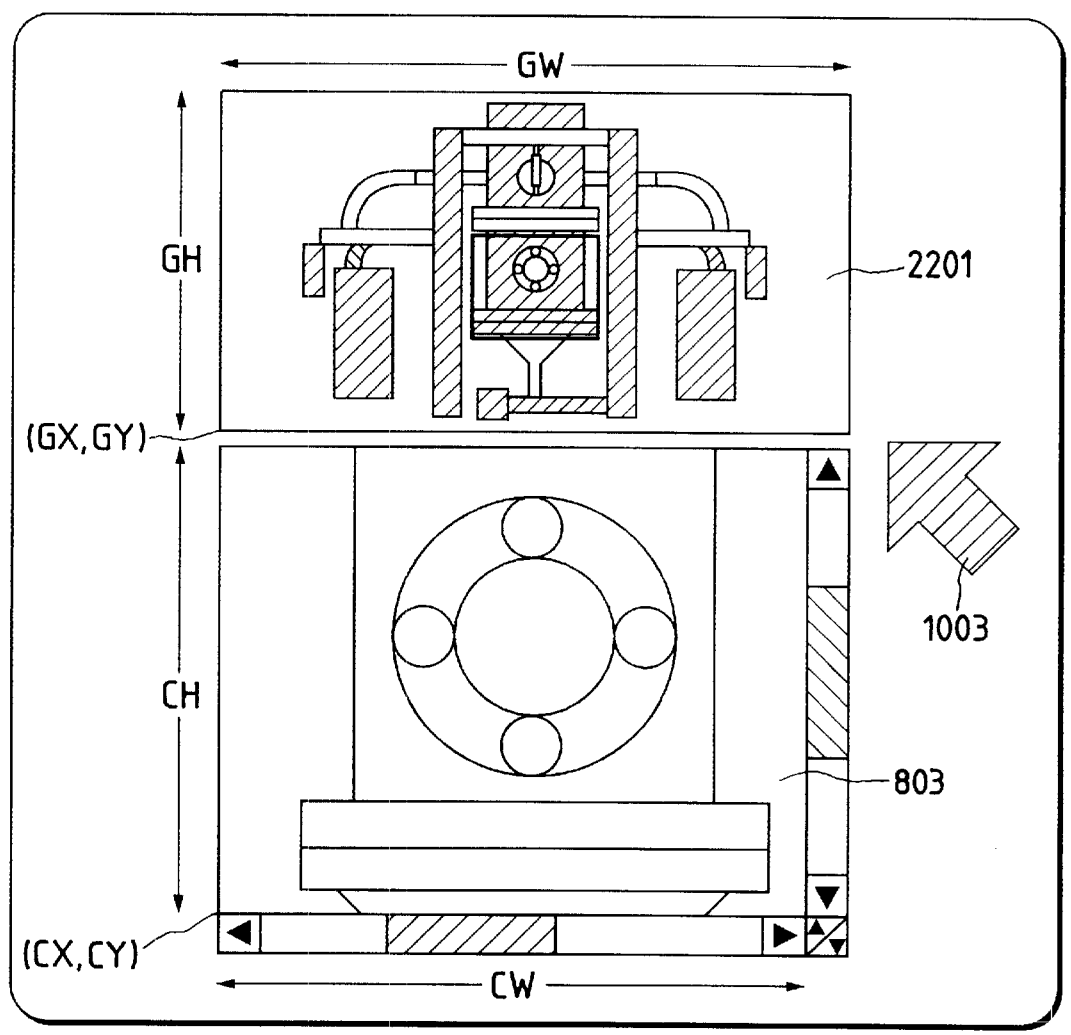
FIG. 21 is a diagram showing an example of a screen according to the present invention.

In the examples explained till now, the whole image taken in by camera 101 is memorized. In this example, the image is not the whole image taken in by camera 101 like FIG. 21. This is an example that uses images 2201 specified by the user (for example, two dimensional figures, three dimensional figures, etc. created from maps and CAD design drawings; these are called the whole figure) as the whole image. The system structure of this example is the same as in the example explained first. In this example, the whole image memory section 107 does not memorize the image acquired from camera 101, but memorizes the whole FIG. 2201 used as a whole image and the relationship between the whole FIG. 2201 and the camera 101, as will be described later.

In this example, the same processing as in the flow of FIG. 19 is executed. In the example of FIG. 19, the directions and the positions on in whole image of two cameras 101 are memorized. In this example, the position of camera 101 is related to whole Figure 2201 defined by the user. When specifying the display area on the whole figure from information indicating the direction and the viewing angle of camera 101, the position on whole Figure 2201 is calculated from information indicating the direction and the viewing angle of camera 101. In this example, in advance, like the data that is shown in Table 1, three points of relationship between the direction of the camera (central direction of the camera) and the position on whole Figure 2201 are memorized. Like the sixth example, the direction ($\alpha$, $\beta$) of the camera and the position ($\gamma$, $\delta$) on the image are interpolated by a secondary curve from the above data.

TABLE 1

|  | Direction angle of camera | Coordinates of image |
| --- | --- | --- |
| POINT A | ($\alpha$1, $\beta$1) | ($\gamma$1, $\delta$1) |
| POINT B | ($\alpha$2, $\beta$2) | ($\gamma$1, $\delta$1) |
| POINT C | ($\alpha$3, $\beta$3) | ($\gamma$1, $\delta$1) |

In (step 202) 2002, by using the interpolation expression of this whole figure and the direction of the camera, area (x0, y0)–(x1–y1) on the whole Figure 2201 of the display area 801 is calculated from the direction (h, v) and the angle of view (ax, ay) of the camera. When controlling the viewing direction of camera 101 on the whole Figure 2201, a camera position detecting element 109 calculates the pickup direction and the viewing angle of camera 101 from the coordinates of the point on the whole image by using an opposite conversion of the above interpolation expression. By using this example, in a case where the whole image cannot be taken in by the camera, and the whole image cannot be used or where figures like maps, etc. are used, this technique can also be used.

According to the present invention, when looking at the image of a camera, the user can easily recognize what he is looking at and what place on the whole image is being viewed. He need not worry about the positions he is looking at when panning or zooming the camera. Because the whole image is renewed with a predetermined timing, this phenomenon can be recognized within the predetermined timing even if a change occurs in the images of the areas other than the specified area of the monitored objects taken in by the camera. Because the state of panning and zooming of the camera is controlled to take in the area specified on the whole image taken in by the camera, the user can control the camera precisely and promptly while recognizing easily the relevant specific parts to be taken in when he wants to take in a specific part of the whole image using the camera.

What is claimed is:

1. In an image display device for displaying an image from a camera on a display screen, the improvement which comprises:

whole image memory means for memorizing a whole image of a whole area that is larger than a sub-area capable of being taken in by the camera;

whole image display means for displaying the memorized whole image;

area image display means for displaying a current image of the sub-area that the camera is taking in;

camera position detecting means for detecting a present position in the whole image, of the sub-area of the current image that the camera is taking in;

camera position display means for displaying a mark on the whole image displayed by said whole image display means showing said present position detected by said camera position detecting means; and whole image renewal means for renewing the whole image that is memorized in said whole image memory means in response to an input of a whole image renewal command.

2. In an image display device for displaying an image received from a camera on a display screen, the improvement which comprises:

whole image memory means for memorizing a whole image of a whole area that is larger than a sub-area that the camera is capable of taking in;

whole image display means for displaying the memorized whole image;

area image display means for displaying a current image of the sub area that the camera is taking in;

camera position detection means for detecting a present position in the whole image, of the sub-area of the current image that the camera is taking in;

camera position display means for displaying a mark on the whole image displayed by said whole image display means showing said present position detected by said camera position detection means;

area image display state detection means for detecting a displaying state of said area image display means; and whole image renewal means for renewing the whole image that is memorized in said whole image memory means so as to renew the whole image, when said area image display state detecting means detects that said area image display means does not display an image of the sub-area that the camera is taking in.

3. In the image display device according to claim 1 or claim 2, which further comprises display switching means for switching between the current area image and the whole image and for displaying both images on the same display screen.

4. In an image display device for displaying an image from a camera on a display screen, the improvement which comprises:
whole image display means for displaying a whole image of a whole area that is larger than a sub area that the camera is capable of taking in;
area specifying means for specifying the sub-area on the whole image displayed by said whole image display means; and
camera control means for controlling said camera to take in the sub-area specified by said area specifying means.

5. In the image display device according to claim 4, wherein said area specifying means specifies a rectangular sub-area on the whole image.

6. In the image display device according to claim 4, which further comprises:
camera position detecting means for detecting a present position in the whole image, of the sub-area of a current image that the camera is taking; and
camera position display means for displaying a mark on the whole image displayed by said whole image display means showing said present position detected by the camera position detecting means.

7. In the image display device according to claim 6, wherein said area specifying means specifies the sub-area by movement, enlargement and contraction of the mark displayed by said camera position display means.

8. In a monitoring system for displaying an image received from a camera on a display screen, the improvement which comprises:
whole image memory means for memorizing a whole image of a whole area that is larger than a sub-area that the camera is capable of taking in;
whole image display means for displaying the memorized whole image;
area image display means for displaying a current image of the sub-area that the camera is taking in;
camera position detecting means for detecting a present position in the whole image, of the sub-area of the current image that the camera is taking in;
camera position display means for displaying a mark on the whole image displayed by said whole image display means showing said present position detected by said camera position detecting means; and
whole image renewal means for renewing the whole image that is memorized in said whole image memory means in response to an input of a whole image renewal command by a user.

9. In a monitoring system for displaying an image from a camera on a display screen, the improvement which comprises:
whole image display means for displaying a whole image of a whole area that is larger than a sub-area that the camera is capable of taking in;
area specifying means for specifying the sub-area on the whole image displayed by said whole image display means; and
camera control means for controlling said camera to take in the sub-area specified by said area specifying means.

10. In an image display device for displaying an image from a camera on a display screen, the improvement which comprises:
whole image memory for memorizing a whole image of a whole panning area of the camera that is larger than a sub-area capable of being taken in by the camera at a single panning position;
whole image display for displaying the memorized whole image;
area image display means which displays a current image of the sub-area that the camera is taking in;
camera position detecting means for detecting a present position in the whole image, of the sub-area that the camera is taking in; and
camera position display means for displaying a mark on the whole image displayed by said whole image display means showing said present position detected by said camera position detecting means.

11. In an image display device according to claim 4, which further comprises area image display means which displays a current image of the sub-area that the camera is taking in and a specified area image of said area specifying means.

12. In an image display device for displaying an image from a camera on a display screen, the improvement which comprises:
whole image memory means for memorizing a whole image of a whole camera panning area of the camera that is larger than a sub-area capable of being taken in by the camera at any single panning position while in a maximum field of view setting;
whole image display means for displaying the memorized whole image;
area image display means for displaying a current image of the sub-area that the camera is taking in;
camera position detecting means for detecting a present position in the whole image, of the sub-area of the current image that the camera is taking in; and
camera position display means for displaying a mark on the whole image displayed by said whole image display means showing said present position detected by said camera position detecting means.

13. In an image display device for displaying an image received from a camera on a display screen, the improvement which comprises:
whole image memory means for memorizing a whole image of a whole camera panning area of the camera that is larger than a sub-area that the camera is capable of taking in at any single panning position while in a maximum field of view setting;
whole image display means for displaying the memorized whole image;
area image display means for displaying a current image of the sub-area that the camera is taking in;
camera position detection means for detecting a present position in the whole image, of the sub-area of the current image that the camera is taking in;
camera position display means for displaying a mark on the whole image displayed by said whole image display means showing said present position detected by said camera position detection means; and
area image display state detection means for detecting a displaying state of said area image display means.

14. In an image display device for displaying an image from a camera on a display screen, the improvement which comprises:

whole image display means for displaying a whole image of a whole camera panning area of the camera that is larger than a sub-area that the camera is capable of taking in at any single panning position while in a maximum field of view setting;

area specifying means for specifying the sub-area on the whole image displayed by said whole image display means, which is to be displayed; and camera control means for controlling said camera to take in the sub-area specified by said area specifying means.

15. In a monitoring system for displaying an image received from a camera on a display screen, the improvement which comprises:

whole image memory means for memorizing a whole image of a whole camera panning area of the camera that is larger than a sub-area that the camera is capable of taking in at any single panning position while in a maximum field of view setting;

whole image display means for displaying the memorized whole image;

area image display means for displaying a current image of the sub-area that the camera is taking in;

camera position detecting means for detecting a present position in the whole image, of the sub-area of the current image that the camera is taking in; and camera position display means for displaying a mark on the whole image displayed by said whole image display means showing said present position detected by said camera position detecting means.

16. In a monitoring system for displaying an image from a camera on a display screen, the improvement which comprises:

whole image display means for displaying a whole image of a whole camera panning area of the camera that is larger than a sub-area that the camera is capable of taking in at any single panning position while in a maximum field of view setting;

area specifying means for specifying the sub-area on the whole image displayed by said whole image display means, which is to be displayed; and camera control means for controlling said camera to take in the sub-area specified by said area specifying means.

* * * * *